(12) United States Patent
Arimitsu et al.

(10) Patent No.: US 9,116,163 B2
(45) Date of Patent: Aug. 25, 2015

(54) DISPLACEMENT MEASURING APPARATUS

(75) Inventors: Yasumichi Arimitsu, Yokohama (JP);
Yasuyuki Miyaoka, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 601 days.

(21) Appl. No.: 13/041,742

(22) Filed: Mar. 7, 2011

(65) Prior Publication Data

US 2012/0069323 A1  Mar. 22, 2012

(30) Foreign Application Priority Data

Sep. 16, 2010  (JP) ................................. 2010-207759
Jan. 15, 2011  (JP) ................................. 2011-006509

(51) Int. Cl.
*G01P 3/36* (2006.01)
*G01B 11/00* (2006.01)
*G01P 3/68* (2006.01)
*G01D 5/245* (2006.01)
*G01D 5/347* (2006.01)
(Continued)

(52) U.S. Cl.
CPC ................ *G01P 3/68* (2013.01); *G01D 5/2451* (2013.01); *G01D 5/34746* (2013.01); *G01P 3/486* (2013.01); *G03G 15/5054* (2013.01); *G03G 2215/0158* (2013.01)

(58) Field of Classification Search
CPC ...... G01B 11/00; G01P 3/36; G01D 5/34746; G01D 5/34715; G01D 5/2457
USPC ............. 356/4.01, 501, 28; 399/208; 382/107
See application file for complete search history.

(56) References Cited

U.S. PATENT DOCUMENTS 4,330,196 A * 5/1982 Yamaguchi ................... 399/208
4,654,525 A * 3/1987 Ebina et al. .............. 250/231.14
5,257,084 A * 10/1993 Marsh ............................. 356/28
(Continued)

FOREIGN PATENT DOCUMENTS

JP  56-166469 A   12/1981
JP  61-038563 U    3/1986
(Continued)

OTHER PUBLICATIONS

Japanese Office Action for JP 2009-286281, mail date Dec. 3, 2013. Cited in related U.S. Appl. No. 12/953,736.
(Continued)

*Primary Examiner* — Luke Ratcliffe
*Assistant Examiner* — Vicente Rodriguez
(74) *Attorney, Agent, or Firm* — Rossi, Kimms & McDowell LLP

(57) ABSTRACT

A displacement measuring apparatus including: a first light detector including a first emitter illuminating optically identifiable marks disposed on a moving body, and a first light receiver detecting light through the marks; a second light detector including a second emitter illuminating the marks and a second light receiver detecting light through the marks, wherein the second light detector is arranged at a predetermined interval from the first light detector in a moving direction of the moving body; an identical point detecting unit detecting a first timing at which the first and second light detector detecting an identical mark among the marks, and a second timing; a velocity calculating unit calculating a velocity of the moving body by using the first and second timing determined by the identical point detecting unit; and a time-sharing light emitting unit allowing the first and second emitter to emit the light in a time-sharing manner.

14 Claims, 16 Drawing Sheets

(51) Int. Cl.
  *G03G 15/00*       (2006.01)
  *G01P 3/486*       (2006.01)

(56) References Cited

U.S. PATENT DOCUMENTS

| | | | |
|---|---|---|---|
| 6,029,118 A * | 2/2000 | Strasser | 702/94 |
| 6,193,376 B1 | 2/2001 | Hayashi et al. | |
| 6,313,460 B1 * | 11/2001 | Haas et al. | 250/231.13 |
| 6,326,617 B1 | 12/2001 | Tomie et al. | |
| 6,859,548 B2 | 2/2005 | Yoshioka et al. | |
| 7,333,634 B2 | 2/2008 | McClanahan | |
| 7,435,946 B2 * | 10/2008 | Kudo et al. | 250/231.13 |
| 7,659,996 B2 * | 2/2010 | Kudo et al. | 356/616 |
| 8,189,868 B2 | 5/2012 | Aimura et al. | |
| 2003/0218788 A1 | 11/2003 | Sakai et al. | |
| 2006/0034489 A1 | 2/2006 | McClanahan | |
| 2006/0049782 A1 | 3/2006 | Vornsand et al. | |
| 2006/0050965 A1 | 3/2006 | Chang et al. | |
| 2006/0077501 A1 | 4/2006 | Sakai et al. | |
| 2007/0064977 A1 | 3/2007 | Nagata | |
| 2007/0273847 A1 | 11/2007 | Minami et al. | |
| 2008/0120056 A1 | 5/2008 | Haino et al. | |
| 2008/0192229 A1 * | 8/2008 | Bruekers et al. | 356/28 |
| 2009/0021186 A1 | 1/2009 | Kim | |
| 2009/0169052 A1 | 7/2009 | Seki et al. | |
| 2010/0232819 A1 * | 9/2010 | Kudo et al. | 399/66 |
| 2010/0265405 A1 | 10/2010 | Toshima et al. | |
| 2011/0218760 A1 | 9/2011 | Takahama et al. | |
| 2012/0069323 A1 | 3/2012 | Arimitsu et al. | |
| 2012/0086338 A1 | 4/2012 | Kim | |

FOREIGN PATENT DOCUMENTS

| | | | | |
|---|---|---|---|---|
| JP | 61-195310 A | | 8/1986 | |
| JP | 2003-65802 A | | 3/2003 | |
| JP | 2008-82820 | * | 4/2008 | 5/36 |
| JP | 2008-082820 A | | 4/2008 | |
| JP | 2008-82820 A | | 4/2008 | |

OTHER PUBLICATIONS

Office Action issued in Japanese Patent Application No. 2011-006509 dated Sep. 25, 2014.

Office Action issued in Japanese Patent Application No. 2011-006509 dated Sep. 25, 2014. Previously cited in an IDS filed Oct. 24, 2014, English translation provided.

Extended European Search Report issued in Corresponding European Patent Application No. 11158395.1, dated Dec. 22, 2014. References cited in Office action have been previously cited.

* cited by examiner

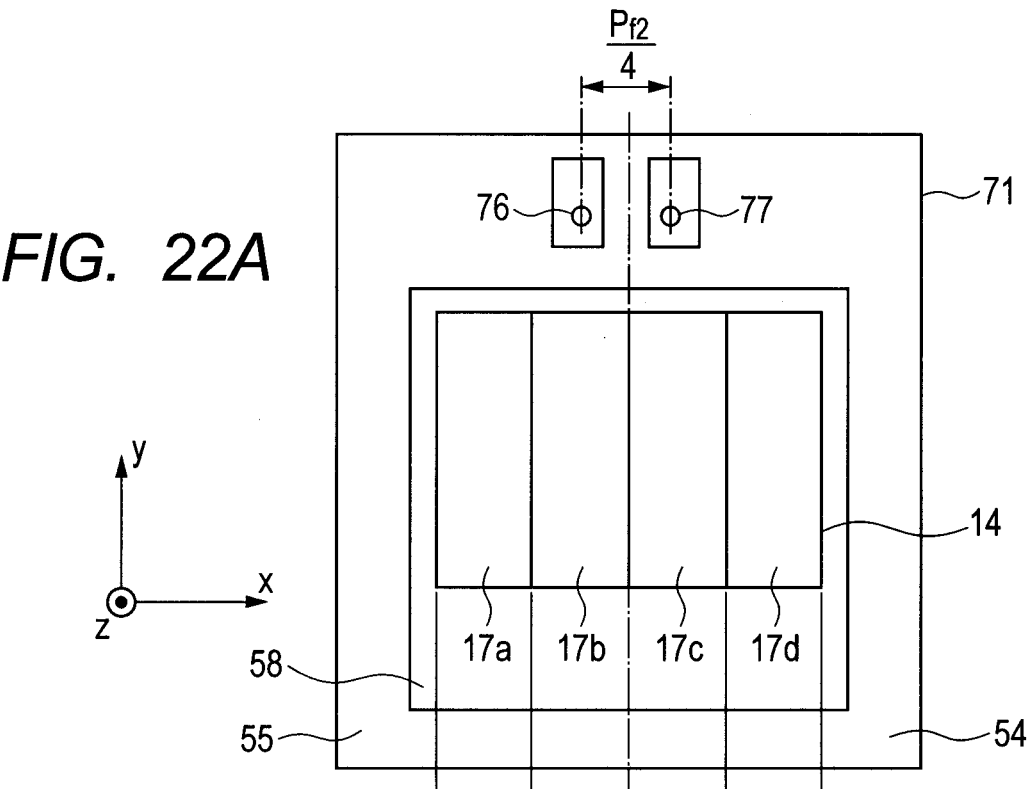
FIG. 22A
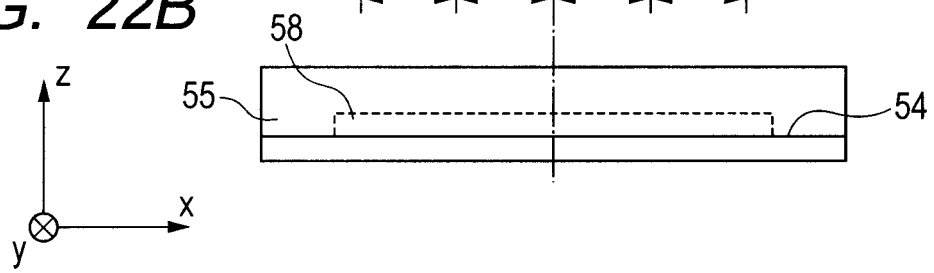
FIG. 22B
FIG. 23
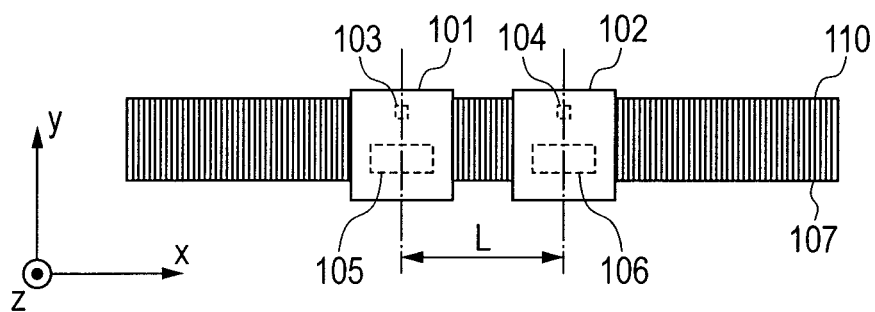

DISPLACEMENT MEASURING APPARATUS

BACKGROUND OF THE INVENTION

1. Field of the Invention

The present invention relates to a displacement measuring apparatus that can detect velocity information of a moving body with the aid of multiple light detectors with high precision, which is suitable for detecting the velocity information of a transport belt in an image forming apparatus such as a copying machine or a printer.

2. Description of the Related Art

In recent years, in a color image forming apparatus such as a color copying machine or a color laser beam printer, for the purpose of reducing color misregistration of a color image, it is required to detect a fluctuation in transport speed of an intermediate transferring belt (moving body) with high precision. As a method of detecting the velocity information of the moving body with high precision, an interval velocity detection method is known.

An image forming apparatus is known, which uses a position detection device for detecting the velocity information of the intermediate transferring belt with the aid of the interval velocity detection method with high precision (Japanese Patent Application Laid-Open No. 2008-82820). According to the disclosure of Japanese Patent Application Laid-Open No. 2008-82820, the interval velocity detection method is used in which a mark on the moving body is detected by two light detectors, and the velocity information of the moving body is detected from two detection timings.

In the displacement measuring apparatus of Japanese Patent Application Laid-Open No. 2008-82820, light from an optical mark disposed on the intermediate transferring belt (moving body) is detected by two detecting units arranged at a distance from each other in a moving direction, and the velocity information of the intermediate transferring belt is obtained according to a detected time interval.

When the velocity of the moving body is detected through the interval velocity detection method, a velocity of an averaged frequency band in a distance (interval length) between the light detectors is detected. For that reason, only velocity fluctuation components lower than a given frequency band proportional to the interval length can be detected. Accordingly, in the case of measuring the velocity of a relatively high frequency band such as the velocity fluctuation components caused by the eccentricity of a driving roller or the eccentricity of a reduction gear in a driving motor, it is necessary to shorten the interval length between the light detectors. However, when those two light detectors are brought close to each other simply in the moving direction of the moving body to shorten the interval length, there arises such a problem that so-called crosstalk phenomena occur in which a reflected image from one light source is superimposed on that of the other light detector.

This problem is described with reference to FIG. 23. In FIG. 23, a moving body 107 has marks 110 formed at a predetermined pitch therebetween. A first light detector 101 includes a first emitter 103 and a first light receiver 105, and a second light detector 102 includes a second emitter 104 and a second light receiver 106. The first light detector 101 and the second light detector 102 are arranged at a distance L in an x-axis direction which is a moving direction of the moving body 107. The first light detector 101 and the second light detector 102 detect the identifiable marks 110 on the moving body 107 moving in the x-axis direction. It is assumed that a time at which the first light detector 101 detects a mark 110 on the moving body 107 is defined as a first time t1, and a time at which the second light detector 102 detects the same mark 110 is defined as a second time t2. In this case, a velocity V of the moving body 107 can be obtained by the following Formula (1).

$$V = \frac{L}{t2 - t1} \quad (1)$$

Because a frequency band of the detected velocity V depends on the distance L, the distance L needs to be shortened in order to increase the velocity band of the velocity V. For example, the velocity fluctuation of an intermediate transferring belt in a color image forming apparatus includes a high frequency component caused by the eccentricity of a driving roller or a reduction gear system of a driving motor. When the velocity of such a high frequency component is detected, and the rotation control of the driving motor is implemented by feedback control, a required dimension of the distance L must be set to 0.6 mm or less according to an estimation results.

In the configuration studied by the inventors of the present invention, each of the first emitter 103 and the second emitter 104 is formed of a light source that emits a divergent light beam. For that reason, as the distance L becomes shorter, an image resulting from reflecting a light emitted from the first emitter 103 by the mark 110 is superimposed on the second light receiver 106 as an optical crosstalk, which becomes an error factor of detection in the second light detector 102. The same phenomena are also developed in a relationship between the second emitter 104 and the first light receiver 105. For that reason, in the above-mentioned conventional velocity detection method, the crosstalk of the images is generated by the multiple emitters with a reduction in the interval length. Therefore, a detection signal is distorted, and a velocity detection precision is deteriorated.

Therefore, an exemplary object of the present invention is to provide a displacement measuring apparatus that can reduce a detection error induced by a crosstalk, and detect a high-frequency-band velocity fluctuation of a moving body with high precision.

SUMMARY OF THE INVENTION

A displacement measuring apparatus according to an aspect of the present invention includes: a first light detector including a first emitter that illuminates optically identifiable marks disposed on a moving body, and a first light receiver that detects light from the optically identifiable marks; a second light detector including a second emitter that illuminates the optically identifiable marks and a second light receiver that detects light from the optically identifiable marks, in which the second light detector is arranged at a predetermined interval from the first light detector in a moving direction of the moving body; an identical point detecting unit that determines a first time at which the first light detector and detects a first mark among the optically identifiable marks, and a second time different from the first time at which the second light detector detects the first mark; a velocity calculating unit that calculates a moving velocity of the moving body by using the first time and the second time determined by the identical point detecting unit; and a time-sharing light emitting unit that allows the first emitter and the second emitter to emit light in a time-sharing manner.

A displacement measuring apparatus according to another aspect of the present invention includes: a first light detector including a first emitter that illuminates optically identifiable marks disposed on a moving body, and a first light receiver that detects light from the optically identifiable marks; and a second light detector including a second emitter that illuminates the optically identifiable marks and a second light receiver that detects light from the optically identifiable marks, wherein the second light detector is arranged at a predetermined interval from the first light detector in a moving direction of the moving body, wherein assuming that a first array direction be a direction from the first emitter to first light receiver and a second array direction be a direction from the second emitter to the second light receiver, the first array direction and the second array direction are opposite to each other.

According to the present invention, the displacement measuring apparatus that can reduce a detection error induced by a crosstalk, and detect a high-frequency-band velocity fluctuation of the moving body with high precision can be provided.

Further features of the present invention will become apparent from the following description of exemplary embodiments with reference to the attached drawings.

BRIEF DESCRIPTION OF THE DRAWINGS

FIG. 22A is a schematic plan view of a modulation measuring device in the fifth embodiment of the present invention.

FIG. 22B is a schematic front view of the modulation measuring device in the fifth embodiment of the present invention.

FIG. 23 is a diagram illustrating how to obtain a velocity of the moving body.

DESCRIPTION OF THE EMBODIMENTS

Figure 1:
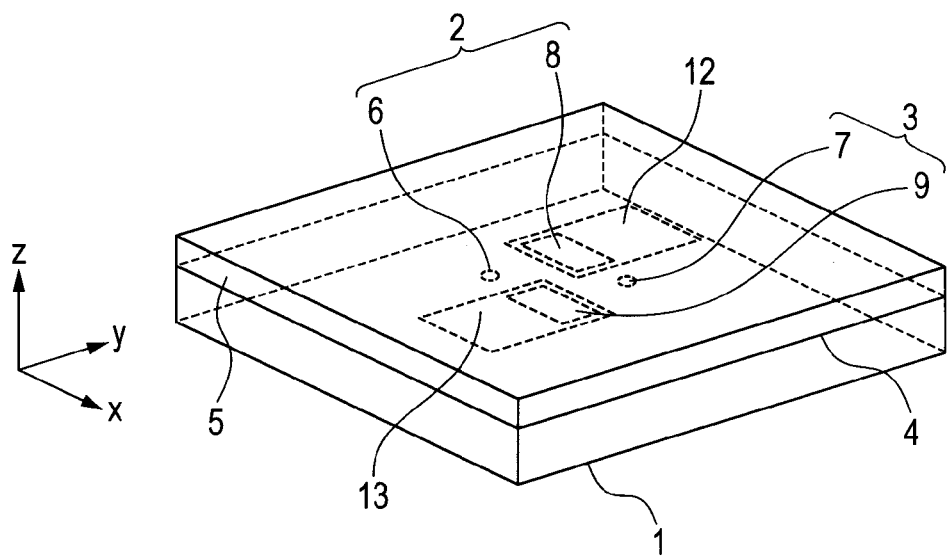
FIG. 1 is a schematic perspective view of a displacement measuring apparatus according to the present invention.

Preferred embodiments of the present invention will now be described in detail in accordance with the accompanying drawings.

In the respective drawings, the same members are indicated by identical reference symbols, and repetitive description is omitted. A displacement measuring apparatus according to the present invention includes a first light detector 2 including a first emitter 6 that illuminates optically identifiable marks 11 provided on a moving body 10, and a first light receiver 8 that detects light from the marks 11. The displacement measuring apparatus also includes a second light detector 3 that is arranged at a predetermined interval L from the first light detector 2 in a moving direction of the moving body 10, and includes a second emitter 7 that illuminates the marks 11, and a second light receiver 9 which detects light from the marks 11.

The displacement measuring apparatus also includes a reference signal generating unit 20a that generates a reference signal 20 having a predetermined frequency, and an energization control unit 16 that controls the energization states of the first and second emitters 6 and 7 in synchronism with the reference signal 20. A frequency f Hz of the reference signal 20 is the integral multiple of a center frequency of a signal output from the first light detector 2 and a signal output from the second light detector 3. The displacement measuring apparatus further includes a time-sharing light emitting unit 15 that allows the first and second emitters 6 and 7 to emit light in a time-sharing manner based on signals from the reference signal generating unit 20a and the energization control unit 16. The displacement measuring apparatus also includes a sampling unit 79 that samples outputs obtained from the first light detector 2 and the second light detector 3 in synchronism with the reference signal 20.

The displacement measuring apparatus also includes the identical point detecting unit 18 that detects a first time $t1_{ak}$ and a second time $t2_{a(k+m)}$ at which the same mark among the marks 11 is detected by the first and second light detectors 2 and 3, respectively. The identical point detecting unit 18 selects at least two sampled values in the vicinity of a predetermined threshold voltage (central voltage) among output values V11 to V16 and V21 to V26 of the first and second light detectors 2 and 3 sampled by the sampling unit 79. Then, the displacement measuring apparatus detects times ($t1_{bo}$, $t1_{a1}$) and ($t2_{bo}$, $t2_{a1}$) at the threshold voltage (threshold phase) from those sampled values (V12, V13), (V15, V16), (V22, V23) and (V25, V26) through interpolating computation. The displacement measuring apparatus includes the velocity calculating unit 18a that calculates a moving velocity Vk+m of the moving body 10 by using the times obtained by the identical point detecting unit 18.

In a displacement measuring apparatus according to one of the other embodiments of the present invention, a time-sharing light emitting unit 15 is used to illuminate the identifiable marks 11 of the moving body 10 with light from the first emitter 6, and light from the marks 11 is detected by the first light receiver 8. After that, the first emitter 6 is turned off, then the second emitter 7 is turned on, and the light from the marks 11 is detected by the second light receiver 9. Then, after mark 11 detected by the first light receiver 8 is detected by the second light receiver 9, the second emitter 7 is turned off, and thereafter the first emitter 6 is turned on. Thus, a series of operation is conducted.

In the displacement measuring apparatus of the present invention, not only the moving velocity of the moving body is calculated, but also the amount of displacement of the moving body is measured.

In addition, in the displacement measuring apparatus of the present invention, the array of the identifiable marks 11 periodically arranged on the moving body 10 is irradiated with the light from the emitter, and a transmission light or a reflected light of the irradiating light from the mark string 11 is received by the light receiver. Then, the amount of displacement of the moving body 10 is calculated according to the detection signal.

The emitters and the light receivers include the first emitter 6, and the first light receiver 8 that detects the transmission light or the reflected light of the irradiating light applied to the array of the marks 11 from the first emitter 6. Further, the emitters and the light receivers include the second emitter 7, and the second light receiver 9 that detects the transmission light or the reflected light of the irradiating light applied to the array of the marks 11 from the second emitter 7. Then, the transmitting light or the reflected light of the irradiating light applied to the array of the marks 11 from the first emitter 6 is detected by the second light receiver 9. Alternatively, the transmission light or the reflected light of the irradiating light applied to the array of the marks 11 from the second emitter 7 is detected by the first light receiver 8.

In the above positional relationship of the respective emitters and light receivers, a unit that allows the first emitter 6 and the second emitter 7 to emit light in a time-sharing manner is provided, and the signals are detected by the respective light receivers in correspondence with the light emission of the respective emitters, to thereby calculate the amount of displacement.

With the above configuration, in another embodiment of the present invention, the first emitter 6 and the first light receiver 8, and the second emitter 7 and the second light receiver 9 are arranged on the same substrate with an angle of 180 degrees therebetween. In other words, pair of the first emitter 6 and the first light receiver 8, and pair of the second emitter 7 and the second light receiver 9 are disposed on the same substrate in a 180-degree rotational symmetry.

First Embodiment

Figure 2:
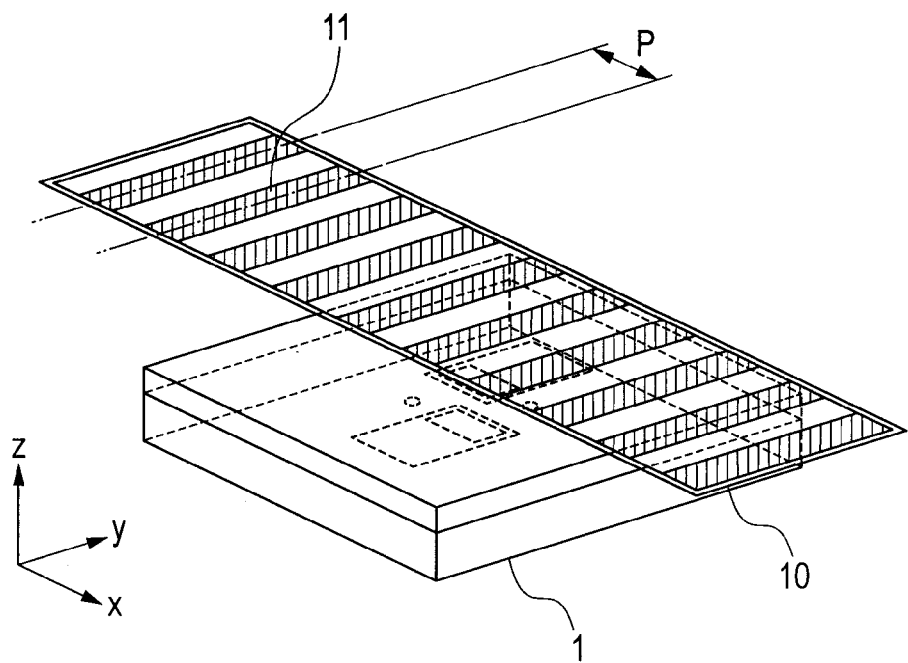
FIG. 2 is a schematic perspective view of the displacement measuring apparatus and a moving body according to the present invention.
Figure 3A:
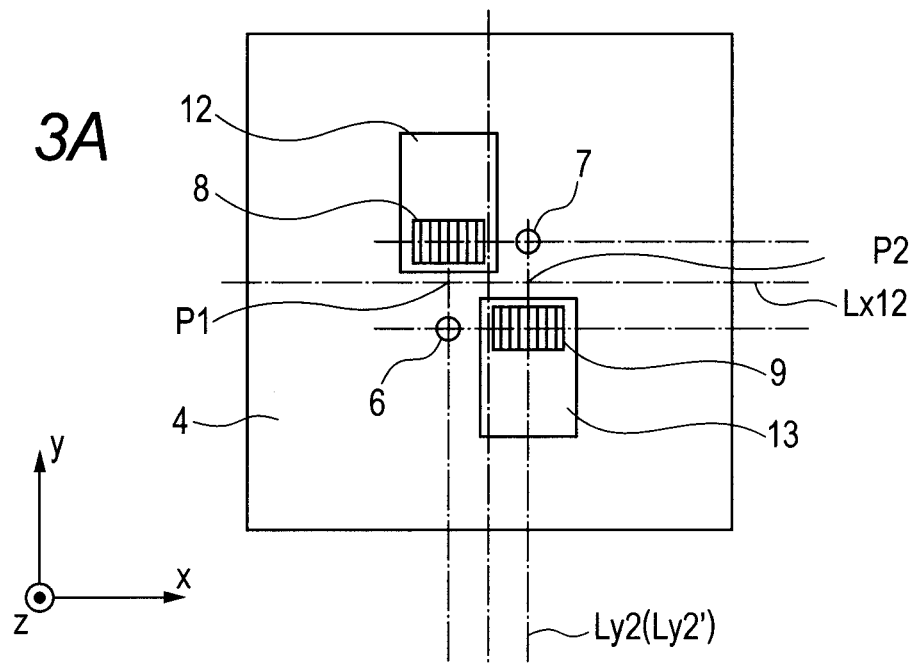
FIG. 3A is a schematic plan view of the displacement measuring apparatus of FIG. 2.
Figure 3B:
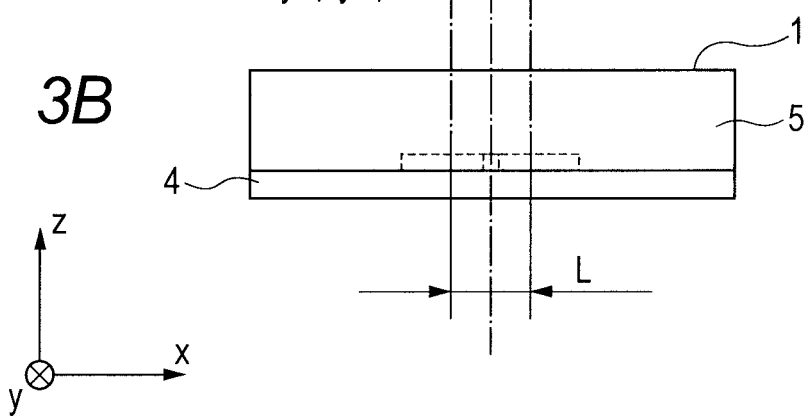
FIG. 3B is a schematic front view of the displacement measuring apparatus of FIG. 2.
Figure 4:
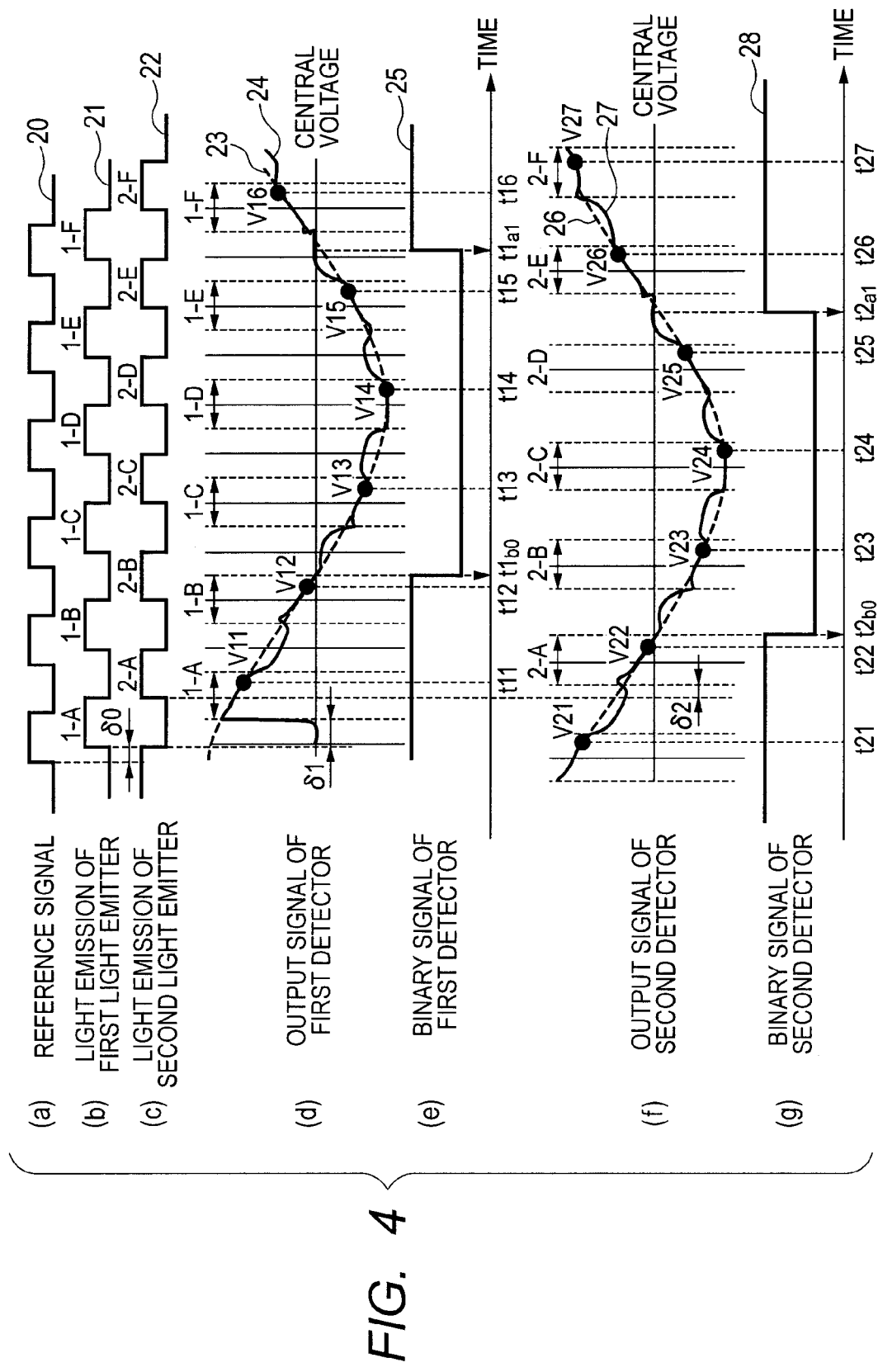
FIG. 4 is a timing chart in a first embodiment of the present invention.
Figure 5:
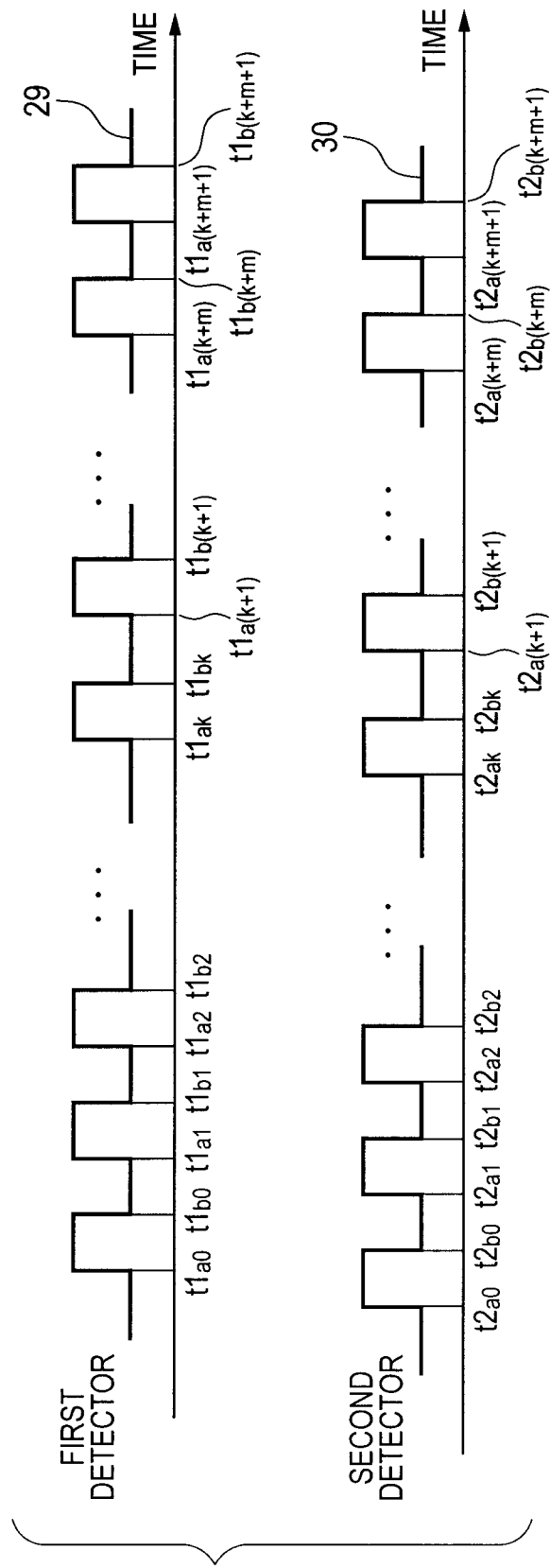
FIG. 5 is a timing chart in the first embodiment of the present invention.
Figure 6:
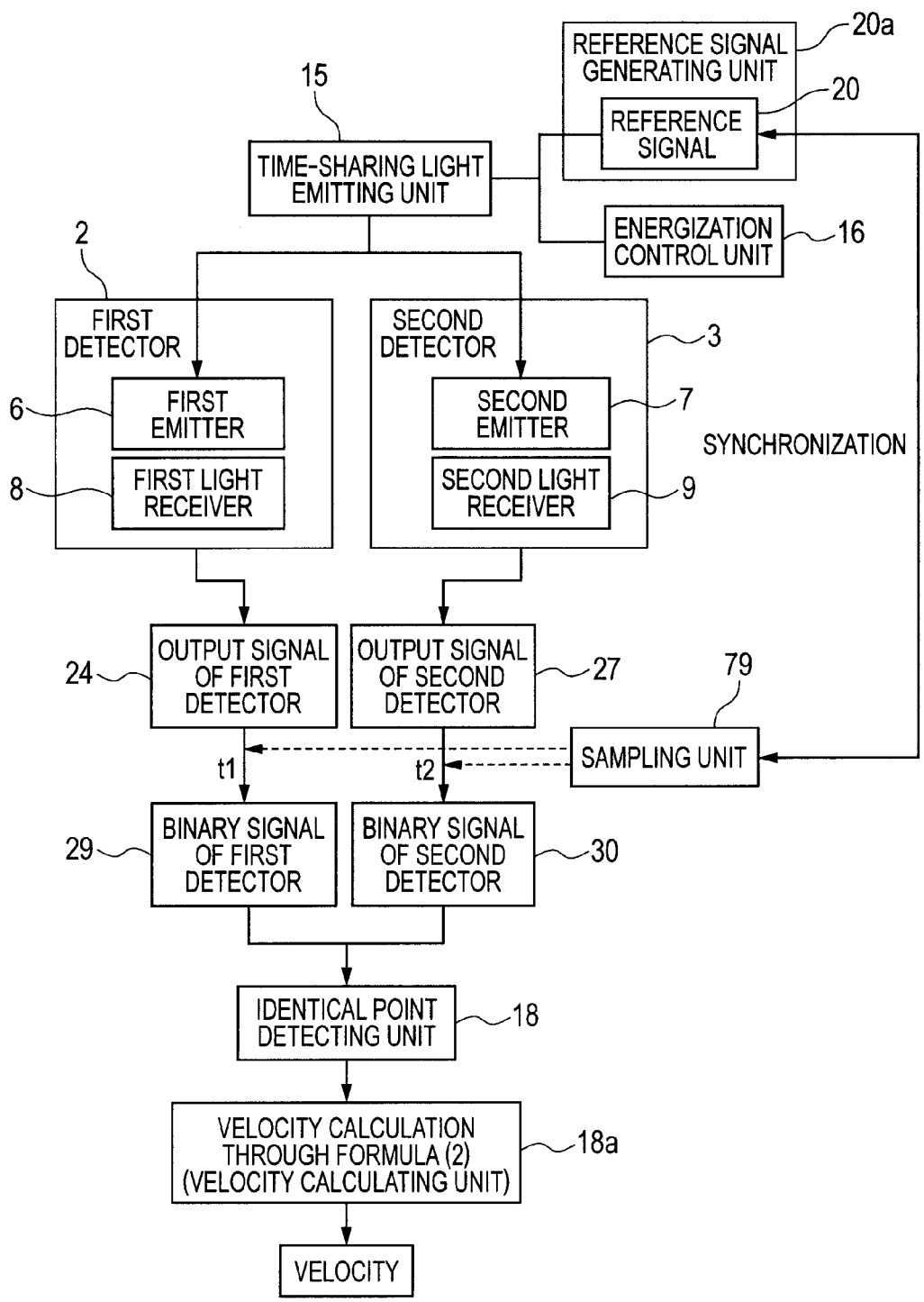
FIG. 6 is a diagram illustrating a step to approach velocity calculation in the first embodiment of the present invention.

A displacement measuring apparatus according to a first embodiment is described with reference to FIGS. 1 to 6. The axes of coordinates (x-axis, y-axis, z-axis) used in the respective drawings are common. FIG. 1 is a schematic perspective view of a displacement measuring apparatus 1 according to this embodiment. FIG. 2 is a schematic perspective view of the displacement measuring apparatus and a moving body according to this embodiment. FIG. 3A is a schematic plan view of the displacement measuring apparatus 1. FIG. 3B is a schematic front view thereof. FIG. 6 is a block diagram illustrating a main portion of a velocity calculating step in this embodiment.

Referring to FIGS. 1 to 3A, and 3B, in the displacement measuring apparatus (velocity detection sensor) 1, the first light detector 2 includes the first emitter 6 and the first light receiver 8, and the second light detector 3 includes the second emitter 7 and the second light receiver 9.

As the first emitter 6 and the second emitter 7, light sources such as current confinement structure LEDs, which can be regarded as point light sources, are used. The first light receiver 8 and a first signal processing circuit 12 are configured as a photo IC. Likewise, the second light receiver 9 and a second signal processing circuit 13 are configured as a photo IC. Further, in this embodiment, the first emitter 6, the second emitter 7, the first light receiver 8, and the second light receiver 9 are mounted on the same substrate 4 in the same plane. The first light detector 2 and the second light detector 3 are entirely protected by a transparent resin layer 5.

As illustrated in FIGS. 3A and 3B, given that a first arrangement direction is defined as a direction from the first emitter 6 to the first light receiver 8 in the first light detector 2 and a second arrangement direction is defined as a direction from the second emitter 7 to the second light receiver 9 in the second light detector 3, the first arrangement direction and the second arrangement direction are parallel to and opposite to each other in x-y plane. As illustrated in FIGS. 3A and 3B, given that an arrangement direction of each of the first and second light detectors 2 and 3 is defined as a direction from emitter to light receiver, the arrangement directions of the first and second light detectors 2 and 3 are disposed on the same substrate to be parallel to and different by 180 degrees from each other when viewed from z-direction. Further, a line Lx12 that connects a midpoint P1 of a segment connecting centers of the first emitter 6 and the first light receiver 8 to each other and a midpoint P2 of a segment connecting centers of the second emitter 7 and the second light receiver 9 to each other is parallel to the velocity detection direction (x-direction).

An inter-center distance L between center lines Ly1 and Ly2 perpendicular to the velocity detecting direction (x-direction) of the first and second light receivers 8 and 9 is identical with an inter-center distance L' between center lines Ly1' and Ly2' perpendicular to the velocity detecting direction (x-direction) of the first and second emitters 6 and 7. Further, the center lines Ly1 and Ly2 perpendicular to the velocity detecting direction (x-direction) of the first and second light receivers 8 and 9 are identical with the center lines Ly1' and Ly2' perpendicular to the velocity detecting direction of the first and second emitters 6 and 7, respectively.

In the above configuration, the first emitter 6 and the second emitter 7 illuminate the identifiable marks 11 on the moving body 10 with divergent light beams, and the light from the marks 11 are received by the first light receiver 8 and the second light receiver 9 to detect the identical mark among the marks.

In this embodiment, the first light detector 2 and the second light detector 3 are arranged in the moving direction on the same substrate 4 with the arrangement directions different from each other by 180 degrees so that a mounting interval L between the first light detector 2 and the second light detector 3 is shortened to enable velocity detection with a higher frequency band. Further, in this embodiment, the line Lx12 that connects the midpoint P1 of the segment connecting the centers of the first emitter 6 and the first light receiver 8 to each other and the midpoint P2 of the segment connecting the centers of the second emitter 7 and the second light receiver 9 to each other is parallel to the moving direction (x-axis direction) of the moving body 10.

With the above configuration, the identical point detecting unit 18 detects times at which the identical point of the marks 11 on the moving body 10 in the y-axis direction is detected, according to signals obtained from the first and second light detectors 2 and 3, respectively. The times at which the identical point on the marks 11 is detected by the identical point detecting unit 18 are detected to suppress a detection error occurring with ununiformity of the marks 11 in the y-axis direction.

Hereinafter, a method of detecting the velocity of the moving body 10 is described. As illustrated in FIG. 2, the identifiable marks 11, which are formed of a reflective member on the moving body 10, are periodically arranged at array pitch P in the moving direction. The marks 11 on the moving body 10 advance in the x-axis direction. It is assumed that time at which the mark 11 is detected by the first light detector 2 is defined as first time t1, and time at which the same mark is detected by the second light detector 3 is defined as second time t2. A velocity V of the moving body 10 is calculated by Formula (1), $$V = \frac{L}{t2 - t1}, \quad (1)$$

where L represents a distance between the first light detector 2 and the second light detector 3 in the x-axis direction (moving direction).

As described about the problem in the above, the above configuration suffers from such a problem that an optical crosstalk occurs in the first and second light detectors 2 and 3, and the marks 11 cannot be detected in the respective light detectors 2 and 3 with high precision.

Hereinafter, time-sharing light emission from the emitters 6 and 7 of the first and second light detectors 2 and 3 by a time-sharing light emitting unit 15 as a method for avoiding an optical crosstalk which is a feature of this embodiment is described. FIG. 4 is a timing chart, and FIG. 6 illustrates a process to calculate velocity (main block diagram). A broken line 23 of an output signal of the first light detector 2 in part (d) of FIG. 4 and a broken line 26 of an output signal of the second light detector 3 in part (f) of FIG. 4 indicate outputs when the emitters 6 and 7 always emit light, independently, in the respective light detectors. FIG. 4 shows sine wave signals of a frequency F Hz. The signals 23 and 26 are sine wave signals synchronous with an array pitch P of the marks 11 on the moving body 10.

Hereinafter, a state of those signals when the respective emitters 6 and 7 perform time-sharing light emission by the time-sharing light emitting unit 15, and a method of detecting the mark position in that state are described. Part (a) of FIG. 4 shows a reference signal (clock) 20 of a fixed frequency (f Hz), and a light emitting timing 21 of the first emitter 6 is synchronous with the reference signal 20 (in the figure, an internal delay δ0 is taken into account). As illustrated in FIG. 6, the time-sharing light emitting unit 15 controls the light emitting states of the first emitter 6 and the second emitter 7 in synchronism with the reference signal 20 from the reference signal generating unit 20a according to a signal for controlling the energization state from the energization control unit 16.

Referring to FIG. 4, a light emitting timing 21 of the first light emitter and a light emitting timing 22 of the second light emitter have an antiphase relation. In the light emitting timing (pulse), "high" is indicative of a lighting state, and "low" is indicative of an extinction state, and the light emitting state in this example is a pulse 50% in duty ratio.

An output from the first light detector 2 when the first emitter 6 and the second emitter 7 turn on in a time-sharing manner is indicated by a curve (solid line) 24 in part (d) of FIG. 4. A state when the first emitter 6 turns on is indicated by 1-A to 1-F, and an output state from the first light detector 2 corresponding to each light emitting state has a delay time δ1 (0≤δ1) with respect to the light emitting timing 21 of the first emitter as shown in the figure. An output state other than the terms 1-A to 1-F corresponding to the extinction time of the first emitter 6 detects a reflected image from another site on the moving body 10 due to the light emitted from the second emitter 7.

Accordingly, the output signal 24 of the first light detector 2 has a distorted waveform influenced by a change in the detected reflected image with a changeover of the emitter, and the frequency characteristics of the emitter and the light detector. The output 24 of the first light detector 2 is sampled at the same frequency as that of the reference signal 20 in synchronism with the reference signal 20 by the sampling unit 79. It is assumed that the output values sampled by the sampling unit 79 are V11 to V16, and the times at which the output values V11 to V16 are obtained are t1 to t16. The sampling points may be in the response ranges 1-A to 1-F when the first emitter 6 turns on. However, taking the frequency characteristics of the emitter and the light detector into consideration, in order to obtain a stable output signal, it is preferred to retard the sampling of the outputs 24 within the respective response ranges 1-A to 1-F as much as possible.

Hereinafter, a method of determining a falling time $t1_{b0}$ and a rising time $t1_{a1}$ of a binary signal 25 in the first light detector 2 by the identical point detecting unit 18 is described. In the first light detector 2, the falling time $t1_{b0}$ is determined through linear interpolation by using the times t12 and t13 at which the two output values V12 and V13 are obtained in the vicinity of the central voltage (threshold voltage) (threshold phase) V0. Likewise, the rising time $t1_{a1}$ is determined through linear interpolation by using the times t15 and t16 in which the two output values V15 and V16 are obtained in the vicinity of the central voltage V0.

The same is applied to the second light detector 3. An output of the second light detector 3 is indicated by a curve (solid line) 27 in part (f) of FIG. 4. It is assumed that a state in which the second emitter 7 turns on is 2-A to 2-F. An output state of the second light detector 3 corresponding to each light emitting state has a delay time δ2 (0≤δ2) with respect to the light emitting timing 22 of the second emitter 7 as shown in the figure. An output state other than the terms 2-A to 2-F corresponding to the lights-out time of the second emitter 7 detects a reflected image from another site on the moving body 10 due to the light emitted from the first emitter 6.

Accordingly, the output signal 27 of the second light detector 3 has a distorted waveform influenced by a change in the detected reflected image with a changeover of the emitter, and the frequency characteristics of the emitter 7 and the light detector 9. The output 27 of the second light detector 3 is sampled at the same frequency as that of the reference signal 20 in synchronism with the reference signal 20 by the sampling unit 79. It is assumed that the output values sampled by the sampling unit 79 are V21 to V27, and the times at which the output values V21 to V27 are obtained are t21 to t27, respectively.

The sampling points may be in the response ranges 2-A to 2-F when the first emitter 6 turns on. However, taking the frequency characteristics of the emitter and the light detector into consideration, in order to obtain a stable output signal, it is preferred to retard the sampling of the outputs 27 within the respective response ranges 2-A to 2-F as much as possible. A method of determining a falling time $t2_{b0}$ and a rising time $t2_{a1}$ of a binary signal 28 in the second light detector 3 is also the same as that in the first light detector 2 described above. In the second light detector 3, the falling time $t2b0$ is determined through linear interpolation by using the times t22 and t23 at which the two output values V22 and V23 are obtained in the vicinity of the central voltage V0. Likewise, the rising time $t2_{a1}$ is determined through linear interpolation by using the times t25 and t26 at which the two output values V25 and V26 are obtained in the vicinity of the central voltage V0.

In this embodiment, the method of generating the binary signal through the linear interpolation by using two successive sampling points that step over the central voltage is described. However, the present invention is not always limited to the two successive sampling points that step over the central voltage which is a threshold voltage, and is applicable to processing in which necessary sampling points of the interpolation according to a required precision are applied. Further, the present invention is not always limited to two points, and interpolation through curve approximation using three or more points in the vicinity of two or more central voltages may be implemented.

According to the above-mentioned method, as shown in parts (e) and (g) of FIG. 4, the binary signals 25 and 28 synchronous with the passing cycle of the marks 11 are obtained by the first light detector 2 and the second light detector 3. When the above processing is continuously conducted, as illustrated in FIG. 5, the binary signal 29 and the binary signal 30 can be obtained by the first light detector 2 and the second light detector 3, respectively. The time $t1_{ak}$ at which a certain mark is detected in the first light detector 2 and the time $t2_{a(k+m)}$ at which the same mark is detected in the second light detector 3 are obtained by the identical point detecting unit 18. As a result, in the velocity calculating unit 18a, the moving velocity $V_{k+m}$ of the moving body 10 is obtained by the following Formula (2).

$$V_{k+m} = \frac{L}{t2_{a(k+m)} - t1_{ak}} \quad (2)$$

In this embodiment, the passing timing of the same mark is represented by the rising times of the binary signals 29 and 30. However, the present invention is not limited thereto, and may be represented by the falling times. Further, in order to suppress an influence of the duty deviation due to a slice level deviation caused by the amplitude fluctuation, a midpoint between the rising time and the falling time may be defined as a mark position. Further, in this embodiment, the velocity calculating unit 18a converts the detection time of the mark into a binary signal, and uses a time based on the binary signal. However, the binarization is not always necessary, and time data at the detection point by the interpolation may be directly used to calculate the velocity.

According to this embodiment, even if the interval L between the first light detector 2 and the second light detector 3 in the moving direction is configured shorter, an influence of the optical crosstalk can be avoided, and the higher-frequency band of the detection velocity can be achieved. Further, in this embodiment, although the optical detecting unit of the reflection type is used, the present invention is not limited to this type, and the same advantages are obtained even if an optical detecting unit of a transmission type is used.

Second Embodiment

A displacement measuring apparatus according to a second embodiment of the present invention is described with reference to FIGS. 1 to 4 and FIGS. 7 to 9B. The axes of coordinates (x-axis, y-axis, z-axis) used in the respective drawings are common. In this embodiment, the detection velocity frequency band is further improved to be higher than that in the first embodiment, and in this configuration, an embodiment in which the emitter conducts time-sharing light emission is described.

Figure 7:
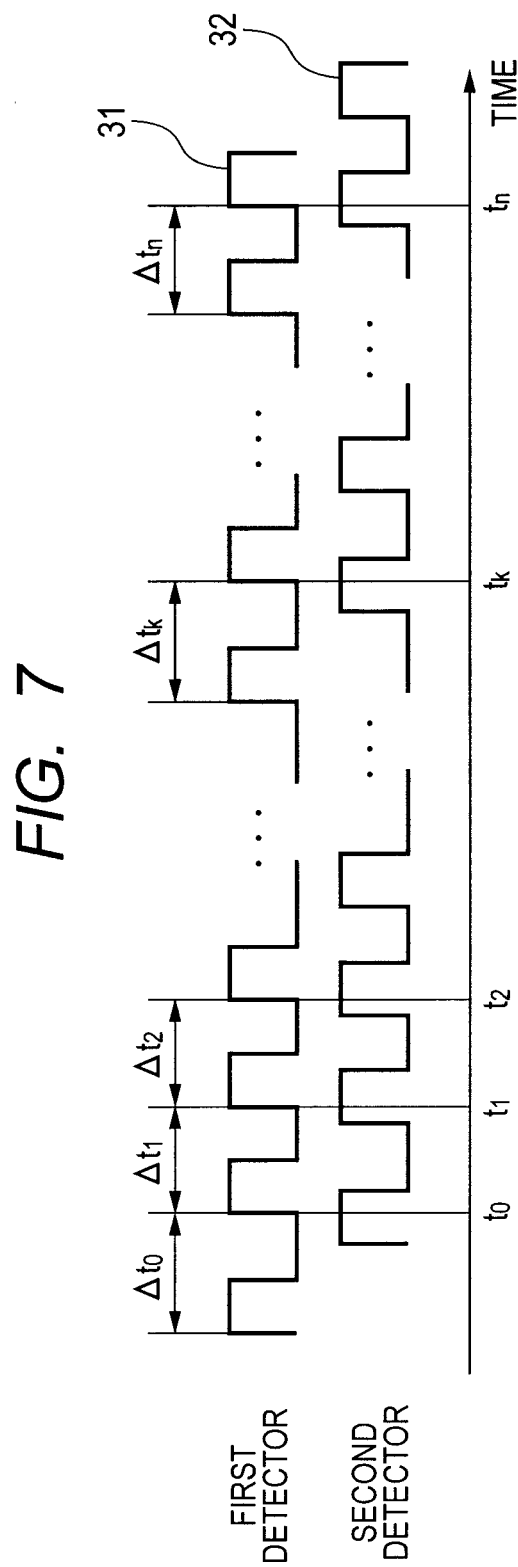
FIG. 7 is a timing chart in a second embodiment of the present invention.
Figure 8:
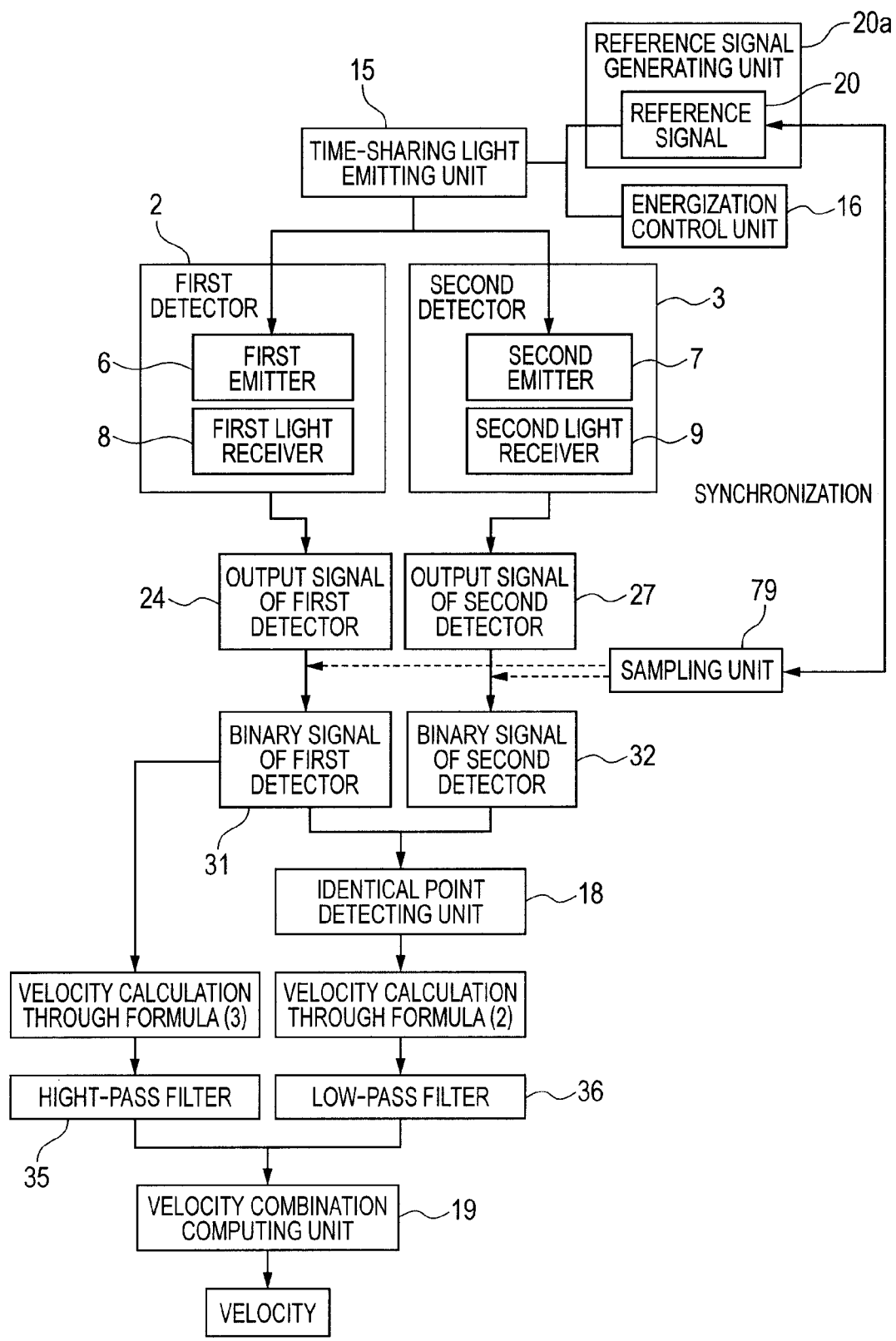
FIG. 8 is a diagram illustrating a step to approach velocity calculation in the second embodiment of the present invention.

First, the configuration of the velocity detection in this embodiment is described below. FIG. 7 illustrates a binary signal 31 obtained by the first light detector 2 and a binary signal 32 obtained by the second light detector 3, wherein these binary signals are obtained by interpolation described in the first embodiment. FIG. 8 illustrates a flow to calculate the velocity in this embodiment.

In this example, it is assumed that a pulse cycle of the binary signal 31 obtained by the first light detector 2, which is synchronous with the k-th mark, is $\Delta t_k$. The moving velocity $V_k$ of the moving body 10 at the time $t_k$ at which the moving body 10 passes through the k-th mark can be written as the following Formula (3) when the marks are arranged at predetermined intervals, that is, the designed array pitch P.

$$V_k = \frac{P}{\Delta t_k} \quad (3)$$

In a magnitude relation between a distance L between the first light detector 2 and the second light detector 3, and the array pitch P of the marks, when the array pitch P of the marks is sufficiently smaller than the distance L between the light detectors (P<<L), the frequency band of the velocity calculated by Formula (3) is higher than the velocity calculated by Formula (2). However, in the velocity $V_k$ detected by Formula (3), the formation error component of the mark array pitch P is directly reflected on the detection velocity precision, and it is difficult to ensure the accumulated error precision of the pitch error especially over a long cycle.

In other words, it means that the detection precision of the low frequency band of the detected velocity contains a large amount of error components. Under the circumstance, in the low frequency band, the interval detection velocity using two light detectors 2 and 3 higher in precision is applied. Further, in the high frequency band, the detected velocity $V_k$ from the above mark array pitch P in any one of the two light detectors 2 and 3 is applied, and control is conducted by using the characteristics of the respective detected velocities.

In this embodiment, as its example, as illustrated in FIG. 8, a low frequency band of the velocity $V_{k+m}$ calculated in Formula (2) that has passed through a low-pass filter 36, and a high frequency band of the velocity calculated in Formula (3) that has passed through a high-pass filter 35 are used. Then, a combination of those velocities is calculated by using a velocity combination computing unit 19 to obtain the velocity. Further, the method of calculating the velocity through Formula (2) by using the identical point detecting unit 18 is identical with that in the first embodiment, and therefore its description is omitted.

Figure 9A:
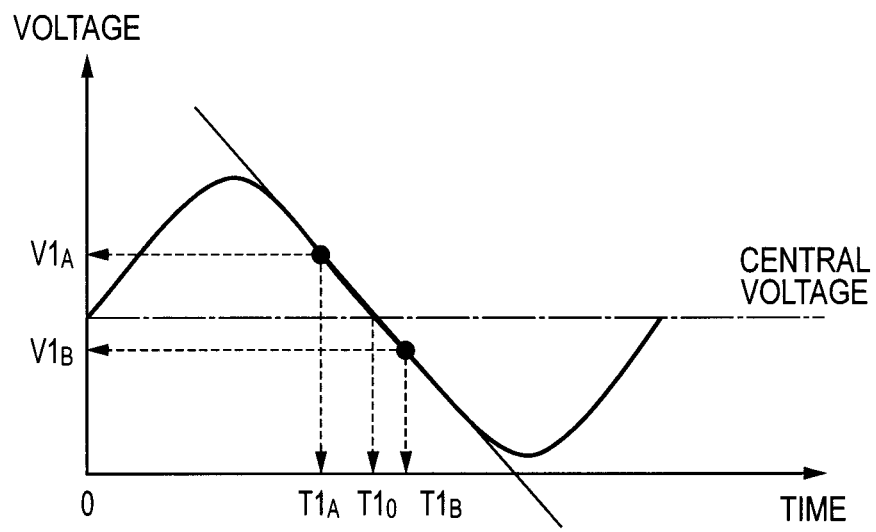
FIG. 9A is a diagram illustrating an output signal from a first light detector according to the second embodiment of the present invention.

In the configuration of the above-mentioned velocity detection, a case in which the emitter is allowed to emit the light in a time-sharing manner with the aid of the energization control unit 16 and the time-sharing light emitting unit 15 based on the reference signal 20 to detect a velocity is described below. First, a relationship between the sampling cycle at the time of the time-sharing light emission and the amount of errors caused by the linear interpolation, which is a basis of the feature of this embodiment, is described in an example of the first light detector 2 with reference to FIGS. 9A and 9B. An output signal 24 of the first light detector 2 and an output signal 27 of the second light detector 3 are sampled in synchronism with the reference signal 20 by the sampling unit 79 (refer to FIG. 4). FIG. 9A shows an output signal of the first light detector 2, and FIG. 9B schematically shows a relationship between the sampling phase and the interpolation error in the first light detector 2.

The output signal of the first light detector 2 which is a signal to be sampled can be regarded as a signal having a certain frequency F Hz as the center frequency because the moving body 10 generally has the velocity fluctuation. In FIG. 9A, it is assumed that time when the output signal of the first light detector 2 becomes the central voltage is $T1_0$, two sampling times in the vicinity of the central voltage are $T1_A$ and $T1_B$, and the output voltages in those times are $V1_A$ and $V1_B$. A relationship between the phase relation between the time $T1_0$ and the sampling time and the interpolation error caused by the linear interpolation becomes a sine wave error as shown in FIG. 9B.

Figure 9B:
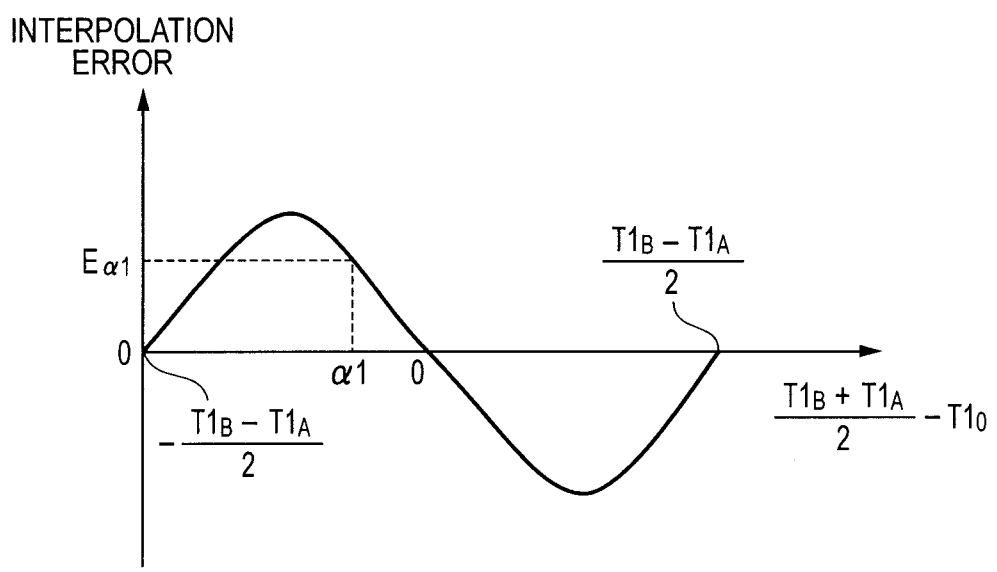
FIG. 9B is a diagram illustrating a sampling phase and an interpolation error according to the second embodiment of the present invention.

The error shown in FIG. 9B is reduced more as the frequency of the reference signal 20 increases more. However, there is a limit of the frequency increasing from the frequency characteristics of the light detector. Further, the interpolation error occurs as the same phenomenon in the first embodiment and the velocity detected by Formula (2). However, because the influence is reduced by a relationship of an inverse proportion with the distance interval L of timing measurement, an influence on the detected velocity in the first embodiment and Formula (2) in this example is minor. On the contrary, in the velocity $V_k$ detected by Formula (3) of this embodiment, the mark array pitch P is shorter than the interval L, and the influence of the interpolation error is relatively large, with the result that countermeasures thereagainst is required.

This embodiment is devised in view of the above-mentioned phenomenon, and has a feature that the frequency f Hz of the reference signal 20 (clock) is set to an integral multiple with respect to the center frequencies of the signals to be detected by the first light detector 2 and the second light detector 3. This is described in detail below.

It is assumed that when the phase relationship between the time $T1_0$ and the sampling time in the first light detector 2 is $\alpha 1$ the interpolation error is $E_{\alpha 1}$. If the signal to be detected is a fixed frequency, the phase relationship of the sampling timing is constant, and the velocity error calculated by Formula (3) includes only a DC component. In practice, the synchrony of the center frequency F of the signal to be detected and the frequency f Hz of the reference signal 20 cannot be compensated due to the error in the mark arrangement pitch P and in the control. In this regard, when the center frequency F of the signal to be detected is an integral multiple of the frequency f Hz of the reference signal 20, a change in the phase of the sampling signal with respect to the signal to be sampled can be suppressed. For that reason, a change in the interpolation error $E_{\alpha 1}$ can be suppressed to a low frequency. The velocity error calculated by Formula (3) is also suppressed to only the low frequency. Accordingly, as illustrated in FIG. 8, because a lower frequency component of the velocity $V_k$ detected through Formula (3) is cut off by the high-pass filter 35 in post-step, the velocity component of the high frequency component in which the error component is reduced through the interpolating computation can be extracted.

Third Embodiment

A displacement measuring apparatus according to a third embodiment of the present invention is described with reference to FIGS. 1 to 4 and FIGS. 10 to 13. The axes of coordinates (x-axis, y-axis, z-axis) used in the respective drawings are common. This embodiment is an example in which the detected velocity frequency bandwidth is more improved to be higher than that in the second embodiment. In this embodiment, because higher-frequency bandwidth is intended, two or more signals different in phase are output in each of the first light detector 2 and the second light detector 3. In this embodiment, signals (phase A signal 33 and phase B signal 34) output from the first light detector 2 and the second light detector 3 are signals different in phase including a phase difference signal of 90 degrees.

Figure 10:
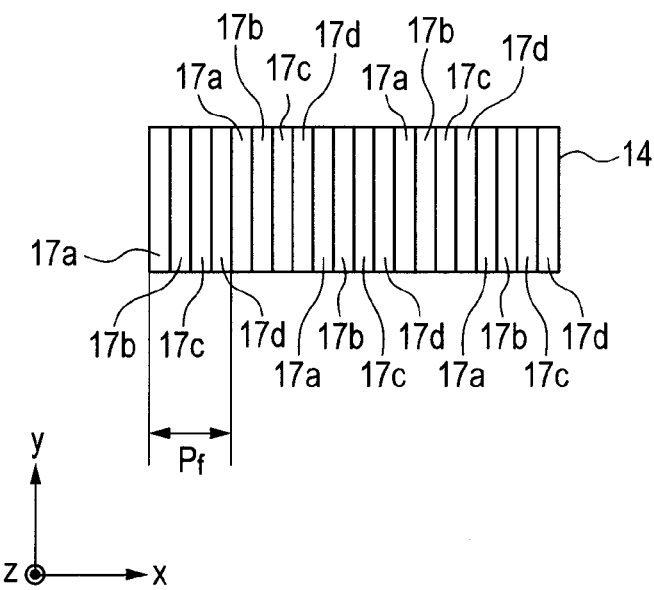
FIG. 10 is a diagram illustrating a light receiver according to a third embodiment of the present invention.
Figure 11:
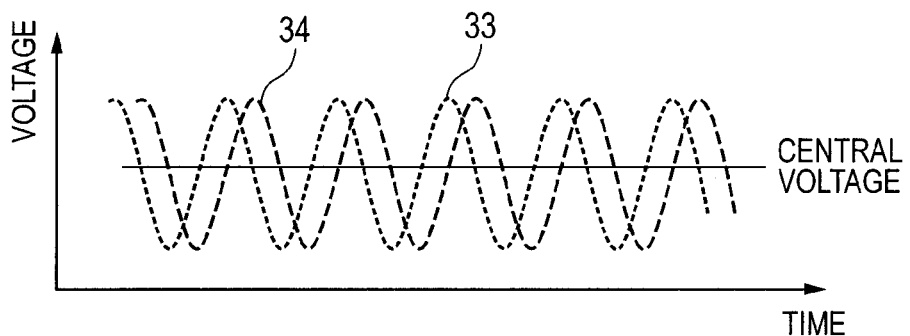
FIG. 11 is a diagram of two analog signals different in phase, which are output from a light receiving element array 14 illustrated in FIG. 10.

This embodiment is described with reference to FIGS. 10 to 12. In this embodiment, the first light receiver 8 and the second light receiver 9 used in the displacement measuring apparatus 1 are constituted of a light receiving element array 14 as schematically illustrated in FIG. 10. In the figure, the light receiving element array 14 is constructed by arraying five sets of four adjacent photodiodes 17a to 17d. When it is assumed that a cycle of the reflected image obtained from the array of the marks on the moving body, which is arranged at pitches of the designed value P is $P_f$, $P_f = 2P$ is satisfied from a geometric relationship. When an array pitch of the components having the photodiodes 17a to 17d as one cycle is $P_f$, and every array interval of the photodiodes 17a to 17d is $P_f/4$, cycle signals different in phase by 90 degrees are generated. Further, the configuration basically functions by one array, but when the multiple arrays are provided, high signal intensity is obtained by using a total of images spatially apart from each other.

The operation of detecting the marks 11 on the moving body 10 in the above configuration is described. With a relative movement of the marks (not shown) to the light receiving element array 14, the reflected image of the marks (not shown) moves on the light receiving element array 14 in an array direction (x-axis direction) of the light receiving elements. A following case is considered, every array interval of the photodiodes 17a to 17d are $P_f/4$, and the reflected image moves in the order of photodiodes 17a, 17b, 17c, and 17d, as described above. Signals obtained from the respective photodiodes 17a, 17b, 17c, and 17d have phase differences of 90 degrees, 180 degrees, and 270 degrees, respectively, with respect to the signal obtained by the photodiode 17a.

In this case, the four signals different in phase at the maximum can be obtained. A signal obtained by differential amplification for the potential that is subjected to photoelectric conversion by the photodiode 17a and the potential that is subjected to photoelectric conversion by the photodiode 17c is defined as a phase A signal. Likewise, a signal obtained by differential amplification for the potential that is subjected to photoelectric conversion by the photodiode 17b and the potential that is subjected to photoelectric conversion by the photodiode 17d is defined as a phase B signal. According to the above-mentioned principle, the phase A signals and the phase B signals become signals 33 and 34 having a phase difference of 90 degrees in an ideal state, as illustrated in FIG. 11. FIG. 12 shows a digital signal obtained by binarizing the analog signals of FIG. 11 by a reference signal, for example, a central voltage shown in FIG. 11. In this embodiment, the velocity is calculated from the time interval of the phase difference of 90 degrees as described below.

The designed value of the array pitch of the marks 11 on the moving body 10 is P, an hence a distance on the marks (not shown) corresponding to the phase difference of 90 degrees between the phase A signal and the phase B signal is P/4. The interval velocity can be detected with the phase difference P/4 of the phase A signal and the phase B signal as an interval.

Figure 12:
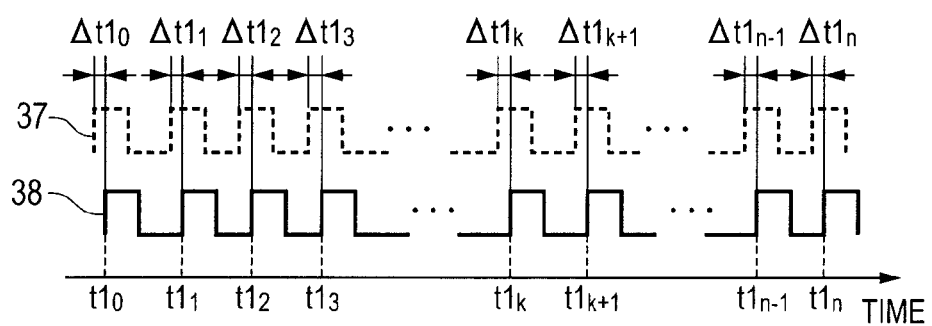
FIG. 12 is a diagram illustrating a binary signal in the third embodiment of the present invention.

Referring to FIG. 12, in the phase difference of the phase A signal 37 and the phase B signal 38 of the binary signals obtained by the first light detector 2, it is assumed that a time interval synchronous with the k-th mark in the timing $t1_k$ is $\Delta t1_k$. The moving velocity of the moving body when the k-th mark passes through can be written as the following Formula (4) by using the array pitch P of the marks on the moving body 10.

$$V_k = \frac{P}{4 \times \Delta t1_k} \quad (4)$$

A following case is considered, the array pitch $P_f/4$ of every photodiode 17a to 17d is sufficiently smaller than the distance L between the light detectors ($P_f/4 \ll L$). In this case, a frequency band of the velocity $V_k$ calculated through Formula (4) is higher than the calculated velocity $V_{k+m}$ calculated through Formula (2), and further the velocity $V_k$ calculated through Formula (3) in the second embodiment.

Further, because the detected velocity ($V_k$) in this embodiment is not basically influenced by the error component of the mark array pitch P, no low frequency component occurs due to this influence. On the other hand, according to the study of the present inventors, it has been found that an optical path length ratio of an outward path and a homeward path in an optical path between the emitter and the light detector changes due to a rotating component of the moving body 10 in the x-axis direction in the figure, with the results that an error occurs in the phase difference of 90 degrees, and an error occurs in the velocity component. Further, in the intermediate transferring belt as the moving body described in the background of the invention, it has been found that the rotating component about the x-axis occurs at a low frequency due to the fluctuation of a belt. Accordingly, in the velocity detection Formula (4) of this embodiment, the velocity error component of the low frequency is contained as in the second embodiment.

Figure 13:
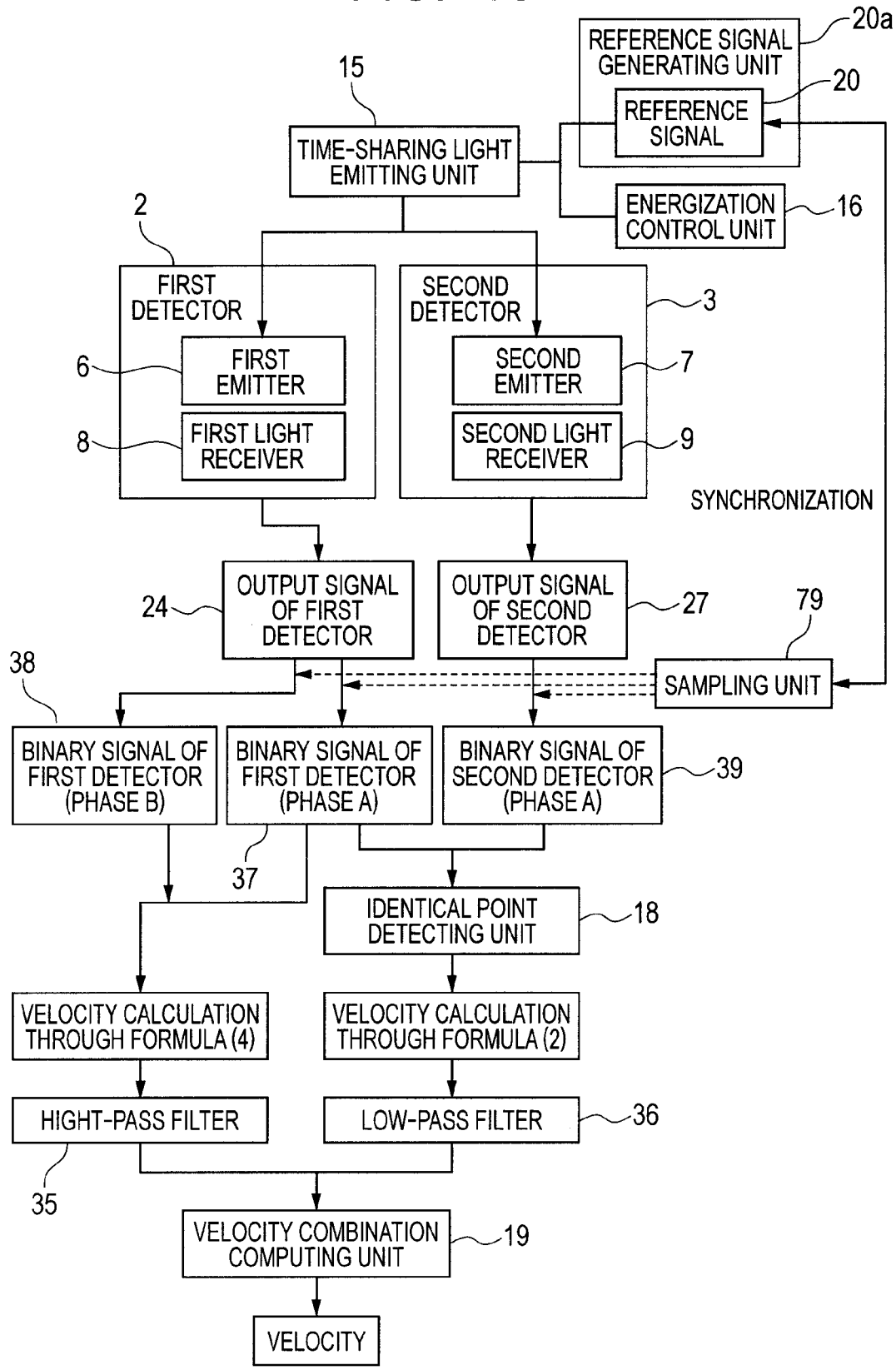
FIG. 13 is a diagram illustrating a step to approach velocity calculation in the third embodiment of the present invention.

FIG. 13 illustrates a flow to calculate the velocity in this embodiment. A method of lighting up the first emitter 6 and the second emitter 7 by the time-sharing light emitting unit 15 including the energization control unit 16 in synchronism with the reference signal 20 is identical with those in the first and second embodiments. As in the second embodiment, as illustrated in FIG. 13, a combination of a low frequency band of the velocity $V_{k+m}$ calculated through Formula (2) that has passed through the low-pass filter 36 and a high frequency band of the velocity $V_k$ calculated through Formula (4) that has passed through the high-pass filter 35 is combined by the velocity combination computing unit 19. As a result, a method of calculating the velocity becomes effective.

Further, the output signal 24 of the first light detector 2 and the output signal 27 of the second light detector 3 (refer to FIG. 4) are sampled in synchronism with the reference signal 20 by the sampling unit 79. The method of calculating the velocity $V_{k+m}$ from the binary signal (phase A) 37 of the first light detector and the binary signal (phase A) 39 of the second light detector through Formula (2) using the identical point detecting unit 18 is identical with that in the first embodiment, and therefore its description is omitted.

Further, in the interpolation error, in this embodiment, the pitch interval used for velocity calculation is shortened by ¼ in comparison with the second embodiment. As described in the second embodiment, because the time measurement distance used for velocity calculation is inversely proportional to an influence degree of the error due to the interpolation, an influence of the interpolation error is further strict. Under the circumstances, in the interpolation error of the detection velocity ($V_k$) of Formula (4) during sampling at the time of the light source time-sharing light emission described in the second embodiment, the reference frequency of the time-sharing light emission is so selected as to obtain a low frequency component, whereby the detection error occurring due to the interpolation can become the low frequency component.

Further, in combination with the velocity calculating method illustrated in FIG. 13, the error component of the high frequency band velocity can be effectively suppressed. That is, also in this embodiment, when the frequency f Hz of the reference signal 20 is set to an integral multiple of the center frequency F of the signal to be detected, a change in the phase of the sampling signal with respect to the signal to be sampled is suppressed, and the velocity error component in the high frequency region is suppressed. Then, as illustrated in FIG. 13, because the low frequency component of the velocity $V_k$ detected through Formula (4) is cut off by the high-pass filter 35 in post-processing, the velocity error component of the necessary high frequency velocity component due to the interpolating computation can be reduced.

Fourth Embodiment

A displacement measuring apparatus according to a fourth embodiment of the present invention is described with reference to FIGS. 1 to 3A, 3B, 10, 11, and 14 to 17. The axes of coordinates (x-axis, y-axis, z-axis) used in the respective drawings are common.

Figure 14:
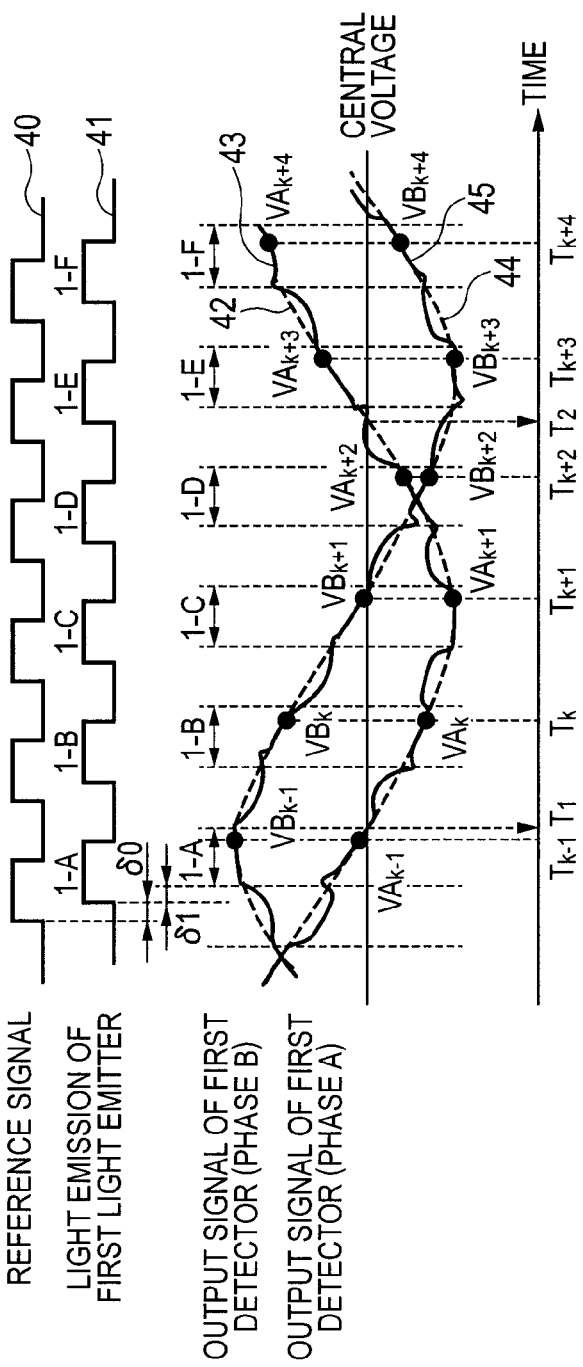
FIG. 14 is a timing chart in a fourth embodiment of the present invention.

In this embodiment, a method is described with reference to FIGS. 14 to 17, in which, in the configuration of the light detector in the displacement measuring apparatus 1 according to the third embodiment, a timing in which a value of the signal to be detected becomes a central voltage is calculated through an arctangent computation using a 90-degree phase difference signal of the signal to be detected to generate a binary digital signal. The first light receiver 8 and the second light receiver 9 are constituted of the light receiving element array 14 illustrated in FIG. 10, which is common to the third embodiment. FIG. 14 is a timing chart showing a reference signal (clock) 40, a light emitting timing 41 of the first emitter 6 synchronous with the reference signal 40, and output states of a phase A signal 43 and a phase B signal 45 which are output signals of the first light detector 2.

Further, in FIG. 14, broken lines 42 and 44 represent output states of the first light detector 2 when the first emitter 6 always emits the light, and the phase A signal and the phase B signal have the phase relationship of 90 degrees with respect to the respective cycles. The light emitting timing 41 of the first emitter 6 has the same frequency as that of the reference signal 40. In the figure, the light emitting timing of the first emitter 6 with respect to the reference signal 40 is represented with a delay time 60 taking the delay of the emitter into account. Likewise, responses of the first light detector to the light emitting states 1-A to 1-F of the first emitter 6 are also represented with the amount of delay δ1 taking the frequency characteristics of the detection system into account.

Figure 17:
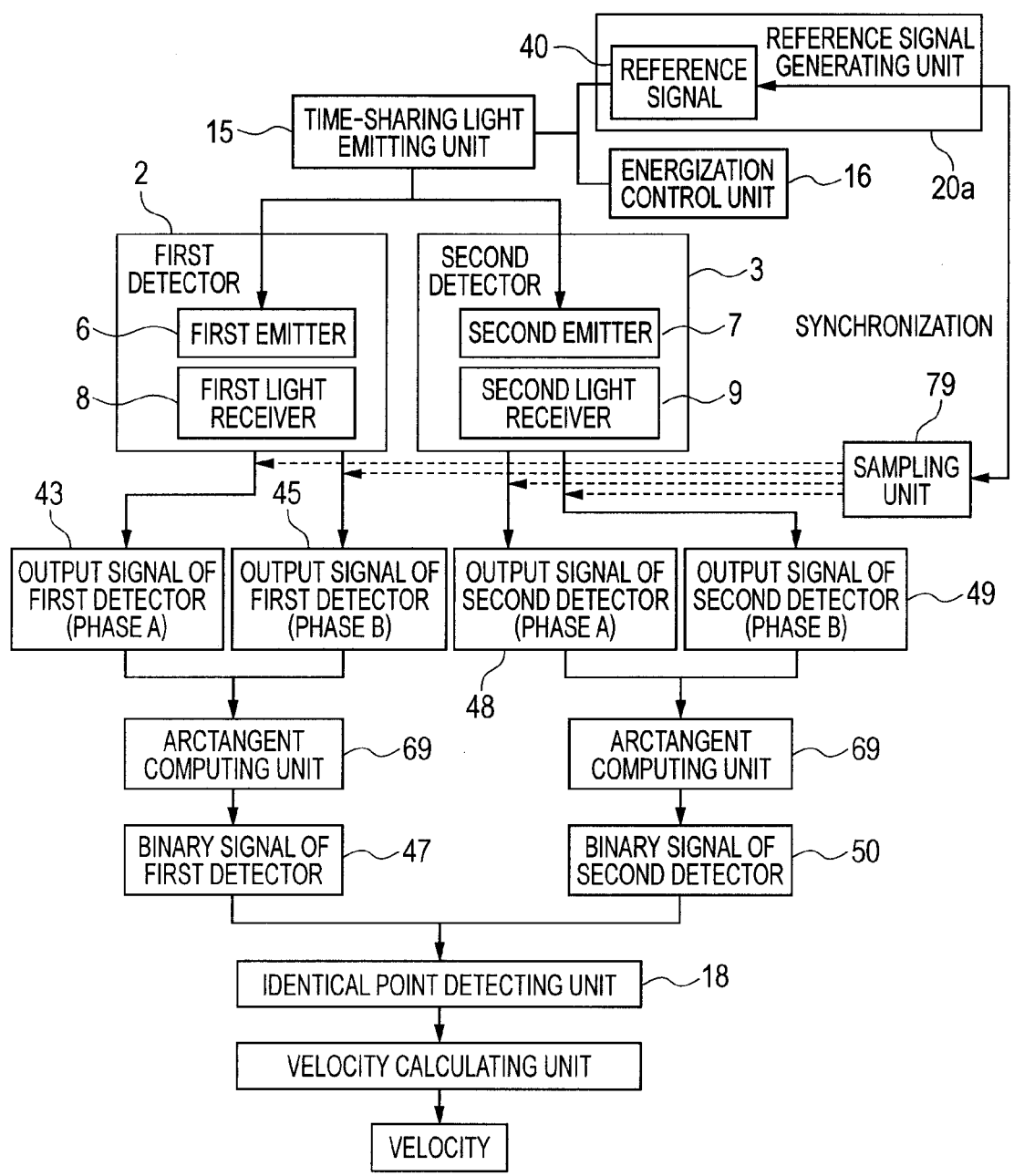
FIG. 17 is a diagram illustrating a step to approach at velocity calculation in the fourth embodiment of the present invention.

FIG. 17 illustrates a flow to calculate the velocity in this embodiment. Hereinafter, a method is described in which, when the respective emitters 6 and 7 emit the light in a time-sharing manner in synchronism with the reference signal 40 by the time-sharing light emitting unit 15 using the energization control unit 16, the states of signals thereof and the mark positions in the states are detected. In FIG. 14, in the first light detector 2, the outputs other than 1-A to 1-F have distorted waveforms affected by the output light of the second emitter 7.

It is assumed that output values when the phase A output 43 of the first light detector 2 is sampled by the sampling unit 79 at the same frequency as that of the clock 40 are $VA_{k-1}$ to $VA_{k+4}$, and times at which $VA_{k-1}$ to $VA_{k+4}$ are obtained are $T_{k-1}$ to $T_{k+4}$. It is assumed that output values when the phase B output 45 of the first light detector 2 is sampled by the sampling unit 79 at the same frequency as that of the clock 40 are $VB_{k-1}$ to $VB_{k+4}$. The sampling points need to be in the response range of 1-A to 1-F when the first emitter 6 turns on, but taking the frequency characteristics of the emitter and the light detector into account, in order to obtain the stable output signal, it is preferred that sampling is retarded within the respective response ranges 1-A to 1-F as much as possible.

Figure 15:
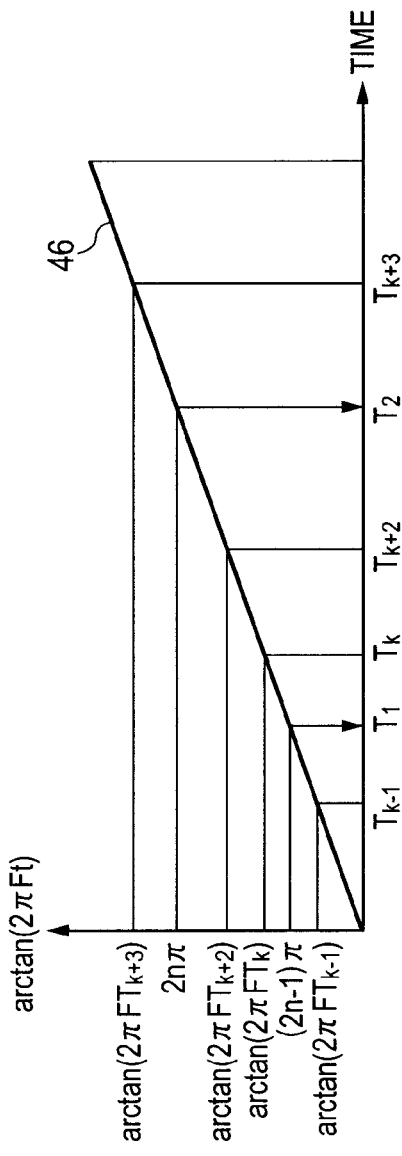
FIG. 15 is a diagram showing a relationship between timing and arctangent computation results of a phase A 43 and a phase B 45, which have a phase difference of 90 degrees, in the fourth embodiment of the present invention.
Figure 16:
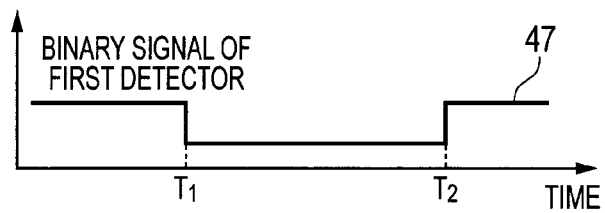
FIG. 16 is a diagram illustrating a binary signal of a first light detector in the fourth embodiment of the present invention.

Referring to FIG. 14, it is assumed that times at which a virtual output (broken line) 42 of the phase A signal 43 becomes the central voltage are T1 and T2. A relationship between the times and the arctangent computation results of calculating the phase A signal 43 and the phase B signal 45 having the phase difference of 90 degrees therebetween using an arctangent computing unit 69 becomes a linear relationship 46 as illustrated in FIG. 15. When it is assumed that the arctangent computation values for the times T1 and T2 are $(2n-1)\pi$ and $2\pi$ (n is a natural number), the times T1 and T2 are obtained by the linear interpolation, and a binary signal 47 of the first light detector 2 illustrated in FIG. 16 can be generated.

Further, the same is applied to the second light detector 3. That is, the second light receiver 9 is constituted of the light receiving element array 14 illustrated in FIG. 10. As a result, a binary signal 50 can be generated through the same arctangent computation from the 90-degree phase difference signals of an output signal (phase A signal) 48 of the second light detector 3 and an output signal (phase B signal) 49 of the second light detector 3, which are signals to be detected.

Through the above-mentioned method, the moving velocity of the moving body 10 can be detected through the method using the identical point detecting unit 18 as in the first embodiment, by using the binary signal 47 of the first light detector 2 and the binary signal 50 of the second light detector 3.

When the method of this embodiment is used, because the passing timing of the moving body 10 and the arctangent computation results have the linear relationship as illustrated in FIG. 15, an error of the linear interpolation occurring in the first embodiment can be suppressed.

Fifth Embodiment

Figure 18A:
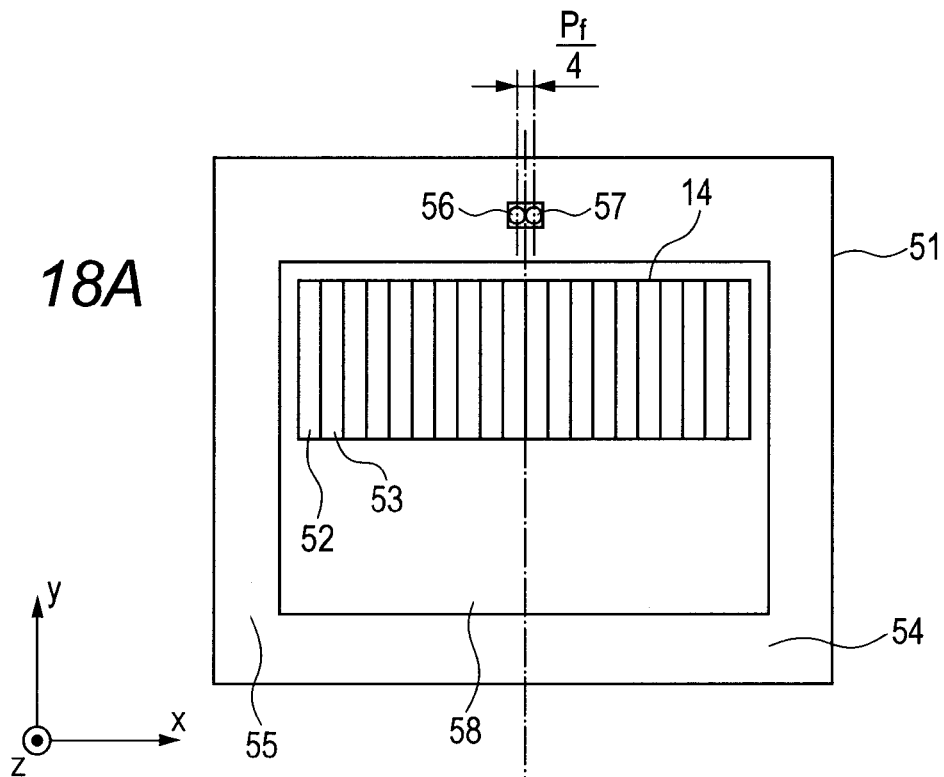
FIG. 18A is a schematic plan view of a displacement measuring apparatus according to a fifth embodiment of the present invention.

A displacement measuring apparatus according to a fifth embodiment is described with reference to FIGS. 10, 11, and 18A to 22B. The axes of coordinates (x-axis, y-axis, z-axis) used in the respective drawings are common. FIG. 18A is a schematic plan view of a displacement measuring apparatus 51 according to this embodiment, and FIG. 18B is a schematic front view thereof.

In this embodiment, first and second light receivers 52 and 53 are alternately arranged on the same semiconductor in a nested fashion. With a set of four photodiodes alternately arranged as a minimum unit, one or more sets are cyclically arranged.

Figure 18B:
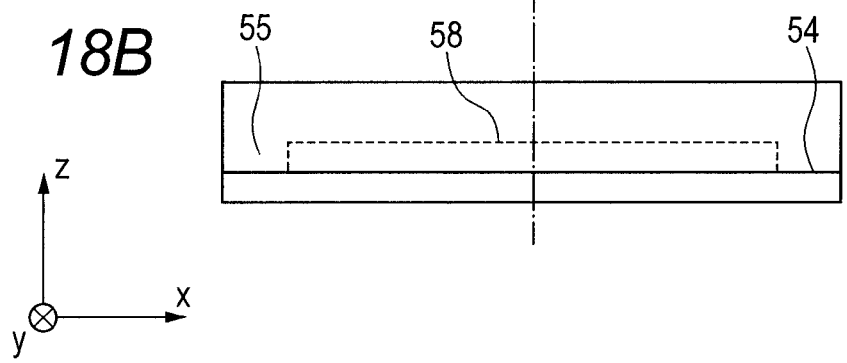
FIG. 18B is a schematic front view of a displacement measuring apparatus according to a fifth embodiment of the present invention.

Referring to FIGS. 18A and 18B, a first emitter 56 is disposed as a point light source, a second emitter 57 is also disposed as a point light source, and the light receiving element array 14 illustrated in FIG. 10 is mounted. The array pitch $P_f$ of an optical image projected on the light receiving element 14 is written as $P_f=2P$ when it is assumed that a designed value of the array interval of the marks (not shown) on the moving body 10 is P. The array intervals of the respective light receiving elements in the light receiving element array 14 of FIG. 18A are $P_f/4$, and the mounting interval between the first emitter 56 and the second emitter 57 is $P_f/4$.

In this embodiment, the combination of the photodiodes 17a and 17c is defined as the first light receiver 52, and the combination of the photodiodes 17b and 17d is defined as the second light receiver 53. Further, the combination of the first emitter 56 and the first light receiver 52 is defined as a first light detector 59, and the combination of the second emitter 57 and the second light receiver 53 is defined as a second light detector 60. A segment connecting the center of the first emitter 56 and the center of the first light receiver 52 is parallel to the y-axis, and likewise a segment connecting the center of the second emitter 57 and the center of the second light receiver 53 is parallel to the y-axis.

Referring to FIGS. 18A and 18B, the first emitter 56, the second emitter 57, and the first and second light receivers 52 and 53 are formed on the same plane, and the first and second light receivers 52 and 53 are formed on the same semiconductor together with a signal processing circuit 58. The first emitter 56, the second emitter 57, and the signal processing circuit 58 are mounted on a substrate 54, and entirely sealed with a transparent resin 55.

In the first light detector 59 in this embodiment, a signal obtained by differentially amplifying the potential that is subjected to photoelectric conversion by the photodiode 17a and the potential that is subjected to photoelectric conversion by the photodiode 17c is defined as an analog detection signal 1. Likewise, in the second light detector 60, a signal obtained by differentially amplifying the potential that is subjected to photoelectric conversion by the photodiode 17b and the potential that is subjected to photoelectric conversion by the photodiode 17d is defined as an analog detection signal 2.

In this embodiment, because the phases of the two signals to be detected always exist within one cycle, there is proposed signal detection with time-sharing light emission applying a method different from those in the first to fourth embodiments. A method of emitting the first emitter 56 and the second emitter 57 in a time-sharing manner in this embodiment is described with reference to a timing chart of FIG. 19 and a flow to calculate the velocity of FIG. 20.

Figure 19:
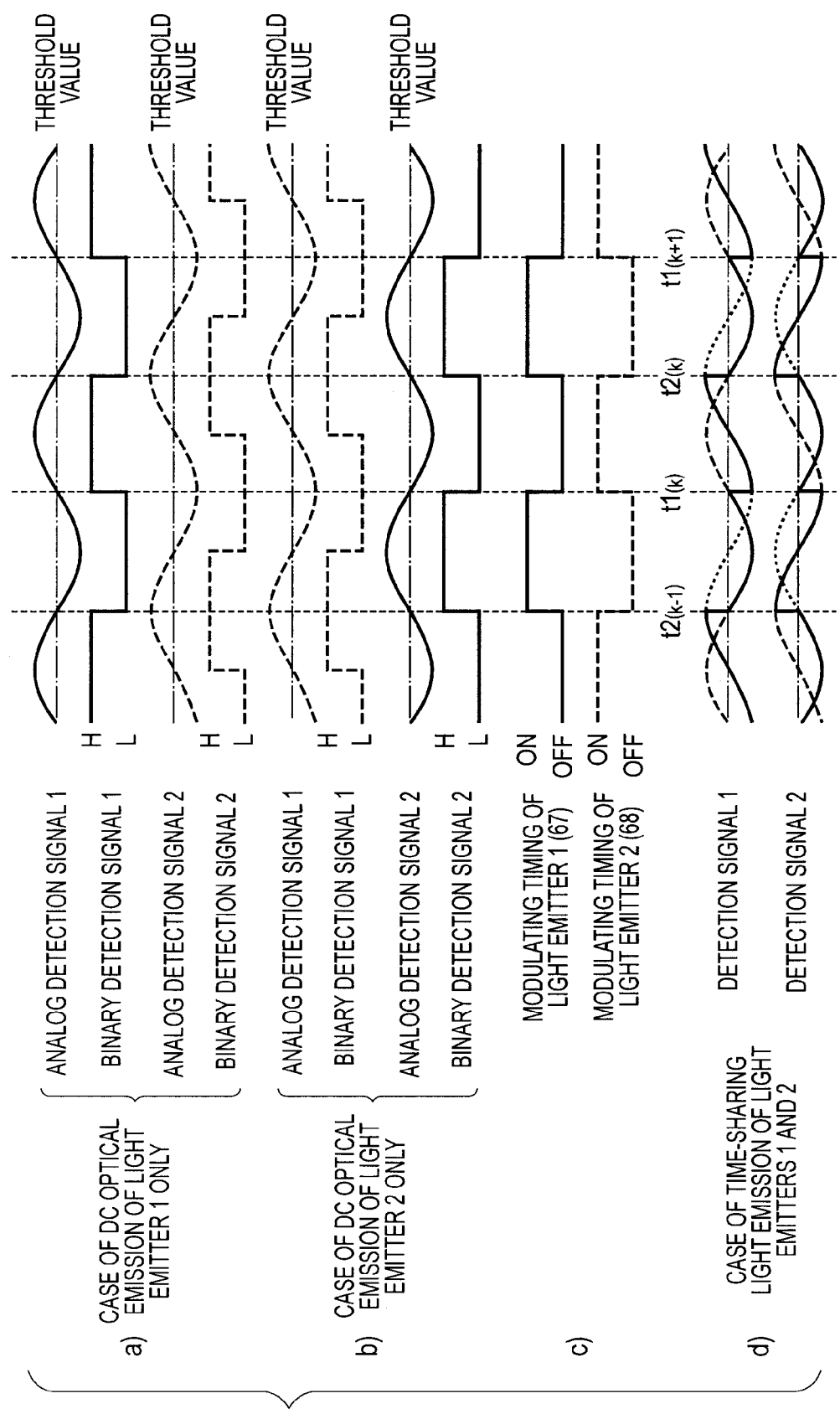
FIG. 19 is a timing chart showing detection signals of first and second light detectors and modulation signals of first and second emitters in the fifth embodiment.
Figure 20:
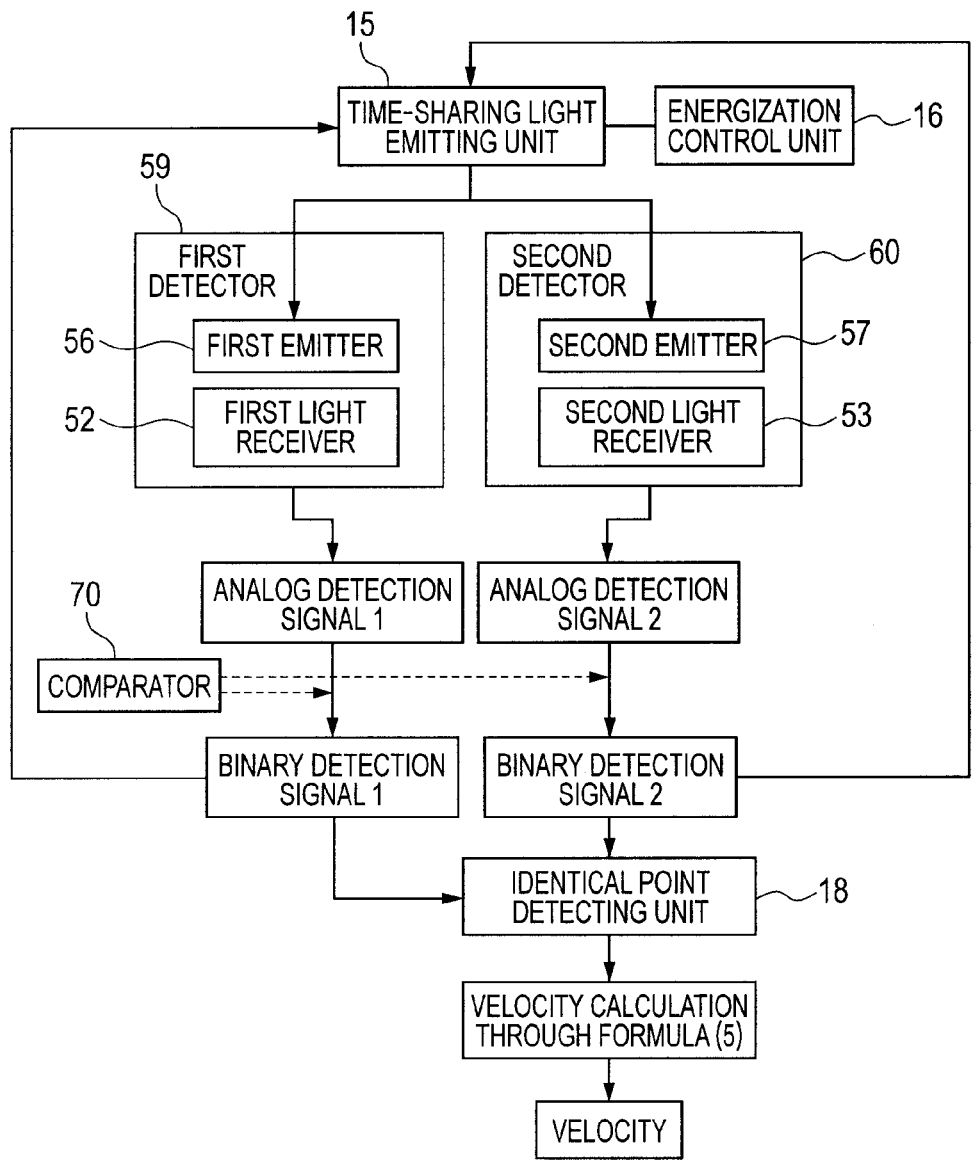
FIG. 20 is a diagram illustrating a step to approach velocity calculation in the fifth embodiment of the present invention.

In FIG. 19, part a) illustrates signals detected by the respective light detectors with movement of the marks when only the first emitter 56 emits light in DC drive mode. Part b) illustrates a timing chart of the signals detected from the respective light detectors with movement of the marks when only the second emitter 57 emits light in DC drive mode. Part c) illustrates modulation signals of the emitters when signal processing is conducted based on the detection signals of parts a) and b), and the first and second emitters emit light in a time-sharing manner. Part d) illustrates the detection signals detected by the respective light detectors as a result of modulation of the emitters. Hereinafter, details of the respective timing charts are described.

First, in FIG. 19, part a) illustrates the analog detection signal 1 detected by the first light detector and the binary detection signal 1 thereof when only the first emitter 56 emits light in DC drive mode. Part a) also illustrates a timing chart of the analog detection signal 2 detected by the second light detector and the binary detection signal 2 thereof. As illustrated in the figure, the respective binary signals are obtained with the central voltage of the analog signal amplitude as a threshold value.

Further, when the light is applied by the first emitter, the necessary detection signal is originally only the first detection signal. Because the second detection signal is detected together at the same time due to the optical crosstalk, the second detection signal needs to be taken into account in the modulating circuit at the time of time-sharing light emission. Those detection signals 1 and 2 basically have a relationship of 90-degree phase difference from the set relationship of the photodiode array cycle and the mark cycle. In part a) of FIG. 19, the required first detection signal is indicated by a solid line, and the second detection signal is indicated by a broken line.

Similarly to part a), part b) illustrates a timing chart of the analog detection signal 1 detected by the first light detector and the binary detection signal 1 thereof when only the second emitter 57 emits light in DC drive mode. Part b) also illustrates a timing chart of the analog detection signal 2 detected by the second light detector and the binary detection signal 2 thereof. As illustrated in the figure, the respective binary signals are obtained with the central voltage of the analog signal amplitude as a threshold value.

Further, when the light is applied by the second emitter, the necessary detection signal is originally only the second detection signal. Because the first detection signal is detected together at the same time due to the optical crosstalk, the first detection signal needs to be taken into account in the modulating circuit at the time of time-sharing light emission. In part b) of FIG. 19, the required second detection signal is indicated by a solid line, and the first detection signal is indicated by a broken line.

Figure 21:
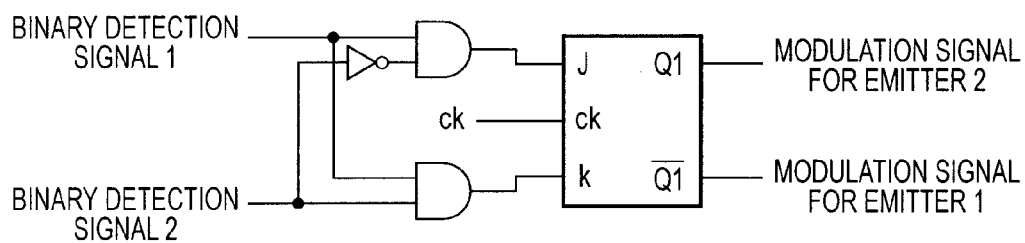
FIG. 21 is a diagram illustrating a modulation circuit of the first and second emitters in the fifth embodiment.

Subsequently, the modulation operation of the emitter and the time measurement operation for detecting the velocity in the above-mentioned detection signal state are described with reference to FIG. 21 illustrating an example of a modulation circuit of the emitter. In FIG. 21, the modulation circuit of the emitter is configured by a JK flip-flop circuit (hereinafter referred to as JK-FF), AND circuits, and a NOT circuit. An output signal Q and a NOT Q (polarity reversal signal of Q) of the JK-FF are used as the modulation controlling signals of the second emitter and the first emitter, respectively. Further, any one of Q and NOT Q is used to measure a time necessary for calculating the velocity to be described later. The JK-FF operates by setting a clock (ck) of a frequency having a time resolution performance necessary for the time measurement.

First, the operation of the modulation circuit in the emitter is described. In the circuit configuration of FIG. 21, as an initial state, the JK-FF is preset to turn on the second emitter. As a result, the detection signals from the first and second light detectors become a state of b) of FIG. 19. The moving body relatively moves, and a reflected image from the mark passes through the light detector, resulting in a change in the detection signals as illustrated in part b) of FIG. 19. When the signal change arrives at a time of $t2_{(k-1)}$ in the timing chart, both a binary detection signal 1 and a binary detection signal 2 become "High" state. At the same time, an input K of the JK-FF becomes "High", and the output Q of the JK-FF is reset by the input ck, and becomes "Low". Because the output Q is a control signal of the second emitter, the second emitter turns off. At the same time, the signal NOT Q, which is a control signal of the first emitter, becomes "High", and the first emitter turns on.

After a time $t2_{(k-1)}$, the first and second detection signals become a state of a) of FIG. 19, and change with relative movement. Further, when the relative movement is advanced to a state of a time $t1_{(k)}$, the binary detection signal 1 by the input ck is changed to the "High" state, and the binary detection signal 2 is changed to the "Low" state. At the same time, the input J of the JK-FF becomes "High", and the output Q of the JK-FF is set, and becomes "High". Because the output Q is the control signal of the second emitter, the second emitter turns on. At the same time, the signal NOT Q, which is the control signal of the first emitter, becomes "Low", and the first emitter turns off.

The above-mentioned operation is continuously implemented with the signal change caused by the relative movement, to thereby obtain a modulation signal of the emitter illustrated in part c) of FIG. 19.

In this situation, the first and second detection signals become signal forms illustrated in part d) of FIG. 19. In part d) of FIG. 19, signals indicated by broken lines and dotted lines are waveforms when the respective emitters emit light in DC drive mode.

Subsequently, the time measurement used for velocity calculation is described. Polarity change timings of the first and second binary signals become timings at which the light detectors pass through the same position of the identifiable marks (not shown) on the moving body, and a timing difference in the identical polarity change between the first and second binary signals is detected so that the passing time of the same mark can be calculated. In this example, the same polarity change positions of the respective detection signals are detected to generate the modulation signal of the emitter. Therefore, the timing difference in the polarity change of the modulation signal of the emitter is measured to calculate the passing time of the same mark.

The passing time measurement can be executed by using the ck signal of the JK-FF necessary for the time measurement resolution performance, and counting the number of ck during a polarity change of the modulation signal of the emitter. A velocity $V_k$ of the moving body in the modulation timing $t2_{(k)}$ is obtained by the following Formula (5).

$$V_k = \frac{P_f}{4 \times (t2_{(k)} - t1_{(k)})} \tag{5}$$

In this embodiment, because the phases of the analog detection signal 1 and the analog detection signal 2 always exist within one cycle of the array cycle of the marks. Accordingly, by detecting the rising timing of the binary detection signal 2 subsequent to the timing at which the rising of the binary detection signal 1 is detected, the same operation as that to be conducted by the identical point detecting unit 18 of the marks can be conducted. In this embodiment, the passing timing of the same mark is represented by the rising times of the binary detection signals 1 and 2. However, the present invention is not limited to this configuration, but the passing timing of the same mark may be represented by the falling time. Further, in order to suppress an influence of the duty ratio deviation due to the slice level deviation caused by the amplitude deviation, a midpoint between the rising time and the falling time may be defined as a mark position.

As described above, according to this embodiment, the emitter turns on in a time-sharing manner so that the first light receiver 52 and the second light receiver 53 are structured in a nested fashion. As a result, a distance (interval length) between the first light detector 59 and the second light detector 60 in the interval velocity detection method is shortened so that a higher-frequency band of the detection velocity can be intended. Further, in the method of this embodiment, because no interpolation is required to generate the binary detection signal 1 and the binary detection signal 2, an error in the linear interpolation occurring in the first embodiment can be prevented from occurring.

The above-mentioned modulation circuit of the emitter is not limited to the circuit exemplified in this embodiment which can detect a time when a specific position on the mark is passed based on the first detection signal during the first emitter emits the light, and a time when a specific position on the same mark is passed based on the second detection signal during the second emitter emits the light. Further, any type of time measurable signal generating circuit is applicable without being limited to this embodiment.

In the above-mentioned embodiment, the configuration of the light receiving elements 14 is described with an example in which the photodiodes 17a to 17d are arrayed in five cycles as illustrated in FIG. 10. However, as illustrated in FIGS. 22A and 22B, the cycle configuration of the light receiving elements 14 can be also applied to a configuration having only one cycle. Similarly, in this case, the positional relationship of the emitter and the light receiver is such that a segment connecting the center of the first emitter 76 and the center of the first light receiver area (17a and 17c) is parallel to the y-axis as with the cycle structure. Likewise, a segment connecting the center of the second emitter 77 and the center of the second light receiver area (17b and 17d) is parallel to the y-axis. This embodiment shows an example in which the segment connecting the center of each light detector and the center of each light receiving area is parallel to the y-axis. However, the present invention is not limited to this configuration. A case in which the segment connecting the center of the emitter and the center of the light receiving area in each light detector is not parallel to the y-axis also falls within the scope of the invention.

In FIGS. 22A and 22B, the respective light receiving element widths of the photodiodes 17a to 17d match the layout cycle, but there is particularly no need to match the respective light receiving element widths with the cycle, and light receiving elements each having a width narrower than the cycle are applicable without any problem. When the respective light receiving element widths are changed, it is desired that the position of the emitters match the center of the light receivers according to the changed width as described above. Further, each of the photodiodes 17a to 17d illustrated in the figure does not always need to be configured by one light receiving element, and each light receiving element can be formed of the light receiving element array. That is, each first and second light receivers (17a, 17c) and (17b, 17d) alternately arranged is formed by a light receiving element array having multiple light receiving elements.

As described above, according to the respective embodiments, the displacement measuring apparatus is obtained which can avoid the crosstalk phenomena of the images caused by projecting the multiple images generated from the multiple emitters on one light receiver, and can detect the velocity of the high-frequency band with high precision.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-207759 filed Sep. 16, 2010, and No. 2011-006509 filed Jan. 15, 2011, which are hereby incorporated by reference herein in their entirety.

What is claimed is:
1. A velocity detection apparatus comprising:
a first light detector including a first emitter that illuminates optically identifiable marks disposed on a moving body, and a first light receiver that detects light from the optically identifiable marks;
a second light detector including a second emitter that illuminates the optically identifiable marks and a second light receiver that detects light from the optically identifiable marks, wherein the second light detector is arranged at a predetermined interval from the first light detector in a moving direction of the moving body;
a reference signal generating unit that generates a reference signal having a predetermined frequency;
a time-sharing light emitting unit that allows the first emitter and the second emitter to emit light in a time-sharing manner in synchronism with the reference signal using an energization control unit that controls energization states of the first emitter and the second emitter;
a sampling unit that samples outputs of the first light detector and the second light detector in synchronism with the reference signal;
an identical point detecting unit that detects a first time at which the first light detector detects a first mark among the optically identifiable marks, and a second time different from the first time at which the second light detector detects the first mark through interpolating computation using the outputs of the first light detector and the second light detector sampled by the sampling unit; and
a velocity calculating unit that calculates a moving velocity of the moving body using the first time and the second time detected by the identical point detecting unit.

2. The velocity detection apparatus according to claim 1, wherein the identical point detecting unit detects a time at which signal output from each of the first light detector and the second light detector has a predetermined threshold voltage through the interpolating computation based on at least two sampled values in a vicinity of the predetermined threshold voltage, the at least two sampled values being sampled by the sampling unit from the signal.

3. The velocity detection apparatus according to claim 1, wherein the predetermined frequency of the reference signal is an integral multiple of a center frequency of a signal output from the first light detector and a signal output from the second light detector.

4. The velocity detection apparatus according to claim 1, wherein:
  each of signals output from the first light detector and the second light detector includes signals different in phase by 90 degrees, and
  in each of the first light detector and the second light detector, the identical point detecting unit samples the signals different in phase by 90 degrees at at least two sampling points through the sampling unit, and calculates a phase of a signal to be detected from the sampled signals through arctangent computation, to thereby detect a time at which the phase of the signal to be detected has a predetermined threshold phase through interpolating computation of the at least two sampling points.

5. The velocity detection apparatus according to claim 1, wherein the time-sharing light emitting unit and the identical point detecting unit repeat a series of operation of illuminating the optically identifiable marks on the moving body with the light from the first emitter, detecting the light from the optically identifiable marks by the first light receiver, then turning off the first emitter, then turning on the second emitter, detecting the light from the optically identifiable marks by the second light receiver, turning off the second emitter after detecting the identical mark among the optically identifiable marks, and then turning on the first emitter.

6. The velocity detection apparatus according to claim 1, wherein the first light detector and the second light detector are arranged on the same substrate so that, when a direction from the first emitter to the first light receiver in the first light detector and a direction from the second emitter to the second light receiver in the second light detector, forms an angle of 180 degrees.

7. The velocity detection apparatus according to claim 1, wherein the first light detector and the second light detector are arranged so that a line connecting a midpoint of a segment connecting centers of the first emitter and the first light receiver and a midpoint of a segment connecting centers of the second emitter and the second light receiver is parallel to a velocity detecting direction.

8. The velocity detection apparatus according to claim 3, further comprising:
  a second velocity calculating unit for calculating a second velocity information based on a signal from one of the first light detector and the second light detector; and
  a velocity combining unit for calculating a velocity by calculating of a combination of detection velocity bands of a first velocity information calculated by the velocity calculating unit and the second velocity information,
  wherein the first light detector and the second light detector each have a pitch detector for detecting an array pitch of marks, and
  wherein the second velocity information is a velocity information calculated from passing time information obtained under the marks passing by the first light detector or the second light detector, and information of a time length of the array pitch of the marks.

9. The velocity detection apparatus according to claim 3, further comprising:
  a second velocity calculating unit for calculating a second velocity information based on a signal from one of the first light detector and the second light detector; and
  a velocity combining unit for calculating a velocity by calculating of a combination of detection velocity bands of a first velocity information calculated by the velocity calculating unit and the second velocity information,
  wherein the first light detector and the second light detector each have a pitch detector for detecting an array pitch of marks,
  wherein each of the signals from the first light detector and the second light detector include signals having a phase difference of an angle of 90 degrees, and
  wherein the second velocity information comprises a velocity information calculated from a time difference information corresponding to the phase difference between the signals obtained under the marks passing by the first light detector or the second light detector, and information of a length of the array pitch of the marks corresponding to the phase difference.

10. The velocity detection apparatus according to claim 1, wherein the optically identifiable marks are arranged along a moving direction of the moving body.

11. A velocity detection apparatus comprising:
  a first light detector including a first emitter that illuminates optically identifiable marks disposed on a moving body, and a first light receiver that detects light from the optically identifiable marks;
  a second light detector including a second emitter that illuminates the optically identifiable marks and a second light receiver that detects light from the optically identifiable marks, wherein the second light detector is arranged at a predetermined interval from the first light detector in a moving direction of the moving body;
  a time-sharing light emitting unit that allows the first emitter and the second emitter to emit light in a time-sharing manner;
  an identical point detecting unit that detects a first time at which the first light detector detects a first mark among the optically identifiable marks, and a second time different from the first time at which the second light detector detects the first mark; and
  a velocity calculating unit that calculates a moving velocity of the moving body using the first time and the second time detected by the identical point detecting unit,
  wherein the time-sharing light emitting unit and the identical point detecting unit periodically performs:
  a first task that causes the first emitter to illuminate the optically identifiable marks;
  a second task that causes the first light receiver to detect light from the first light emitter via a predetermined point of the optically identifiable marks;
  a third task that causes the second emitter to illuminate the optically identifiable marks after turning off the first emitter after the first receiver detects light from the first light emitter;
  a fourth task that causes the second light receiver to detect light from the second light emitter via the predetermined point of the optically identifiable marks; and
  a fifth task that causes the second emitter to be turned off after the second light receiver detects light from the second emitter and then returns to the first task.

12. The velocity detection apparatus according to claim 11, wherein the optically identifiable marks are arranged along a moving direction of the moving body.

13. An image forming apparatus comprising:
  a moving body; and
  a velocity detection apparatus comprising:
  a first light detector including a first emitter that illuminates optically identifiable marks disposed on a moving body, and a first light receiver that detects light from the optically identifiable marks;
  a second light detector including a second emitter that illuminates the optically identifiable marks and a second light receiver that detects light from the optically identifiable marks, wherein the second light detector is arranged at a predetermined interval from the first light detector in a moving direction of the moving body;

a reference signal generating unit that generates a reference signal having a predetermined frequency;

a time-sharing light emitting unit that allows the first emitter and the second emitter to emit light in a time-sharing manner in synchronism with the reference signal using an energization control unit that controls energization states of the first emitter and the second emitter;

a sampling unit that samples outputs of the first light detector and the second light detector in synchronism with the reference signal;

an identical point detecting unit that detects a first time at which the first light detector detects a first mark among the optically identifiable marks, and a second time different from the first time at which the second light detector detects the first mark through interpolating computation using the outputs of the first light detector and the second light detector sampled by the sampling unit; and a velocity calculating unit that calculates a moving velocity of the moving body using the first time and the second time detected by the identical point detecting unit.

14. An image forming apparatus comprising:

a moving body; and a velocity detection apparatus comprising:

a first light detector including a first emitter that illuminates optically identifiable marks disposed on a moving body, and a first light receiver that detects light from the optically identifiable marks;

a second light detector including a second emitter that illuminates the optically identifiable marks and a second light receiver that detects light from the optically identifiable marks, wherein the second light detector is arranged at a predetermined interval from the first light detector in a moving direction of the moving body;

a time-sharing light emitting unit that allows the first emitter and the second emitter to emit light in a time-sharing manner;

an identical point detecting unit that detects a first time at which the first light detector detects a first mark among the optically identifiable marks, and a second time different from the first time at which the second light detector detects the first mark; and a velocity calculating unit that calculates a moving velocity of the moving body using the first time and the second time detected by the identical point detecting unit, wherein the time-sharing light emitting unit and the identical point detecting unit periodically performs:

a first task that causes the first emitter to illuminate the optically identifiable marks;

a second task that causes the first light receiver to detect light from the first light emitter via a predetermined point of the optically identifiable marks;

a third task that causes the second emitter to illuminate the optically identifiable marks after turning off the first emitter after the first receiver detects light from the first light emitter;

a fourth task that causes the second light receiver to detect light from the second light emitter via the predetermined point of the optically identifiable marks; and a fifth task that causes the second emitter to be turned off after the second light receiver detects light from the second emitter and then returns to the first task.

* * * * *